United States Patent
Sanada et al.

[11] Patent Number: 5,732,569
[45] Date of Patent: Mar. 31, 1998

[54] ADSORPTION TYPE COOLING APPARATUS, METHOD OF CONTROLLING COLD OUTPUT OF SAME, AND FIN TYPE ADSORBENT HEAT EXCHANGER FOR USE IN THE SAME

[75] Inventors: Masaru Sanada; Makota Yamamoto; Fujio Komatu; Makoto Fujii, all of Tokyo, Japan

[73] Assignee: Mayekawa Mfg. Co., Ltd., Tokyo, Japan

[21] Appl. No.: 647,992

[22] PCT Filed: Nov. 28, 1994

[86] PCT No.: PCT/JP94/01993

§ 371 Date: Aug. 15, 1996

§ 102(e) Date: Aug. 15, 1996

[87] PCT Pub. No.: WO95/14898

PCT Pub. Date: Jun. 1, 1995

[30] Foreign Application Priority Data

| Nov. 29, 1993 | [JP] | Japan | 5-323119 |
| Apr. 22, 1994 | [JP] | Japan | 6-107916 |
| Jul. 27, 1994 | [JP] | Japan | 6-194959 |

[51] Int. Cl.[6] .................................. F25B 17/08
[52] U.S. Cl. ........................ 62/481; 62/148; 62/480
[58] Field of Search ...................... 62/106, 148, 101, 62/476, 480, 481

[56] References Cited

U.S. PATENT DOCUMENTS

| 1,774,820 | 9/1930 | Williams | 62/148 |
| 1,897,980 | 2/1933 | Hulse | 62/148 |
| 1,908,413 | 5/1933 | Elfving | 62/148 |
| 2,340,887 | 2/1944 | Erland Af Kleen | 62/148 |
| 4,694,659 | 9/1987 | Shelton | 62/106 |
| 4,976,117 | 12/1990 | Crozat et al. | 62/480 |
| 5,024,064 | 6/1991 | Yonezawa et al. | 62/106 |
| 5,359,864 | 11/1994 | Yamada | 62/480 |

FOREIGN PATENT DOCUMENTS

| 4-316966 | 4/1991 | Japan . |
| 5-272833 | 3/1992 | Japan . |
| 5-296598 | 4/1992 | Japan . |
| 5-296599 | 4/1992 | Japan . |
| 6-002984 | 6/1992 | Japan . |

*Primary Examiner*—William Doerrler
*Attorney, Agent, or Firm*—Evenson, McKeown, Edwards & Lenahan P.L.L.C.

[57] ABSTRACT

This invention seeks to provide an adsorption type air cooler, which has high COP and is capable of stable operation for long time. In the prior art, when vapor coolant produced through heat exchange with load water in a coolant tank functioning as an evaporator is adsorbed in an adsorbent heat exchanger, cooling water for removing the heat of adsorption is circulated at a constant temperature and a constant flow rate determined by normal environment.

According to the invention as claimed in claim 1, the temperature and flow rate of cooling water for removing the heat of adsorption are controlled artificially according to the cold output of load water by utilizing heated cooling water after the removal of the heat of adsorption or heat source water, etc.

According to the invention as claimed in claim 1, a coolant tank and a load heat exchanger unit are provided as separate units. A load cooler is provided for cooling the load while partly evaporating the coolant through heat exchange between liquid coolant supplied from the coolant tank through a pump and the load. Mixture fluid of liquid coolant and vapor coolant after the heat exchange in the load cooler are returned to the coolant tank for separation of gas and liquid. Because the coolant tank and the load cooler are provided separately, the heat exchange with the load is performed by utilizing the latent heat of evaporation of coolant independently of possible temperature variations in the coolant tank. It is thus possible to obtain load heat at a constant temperature.

6 Claims, 17 Drawing Sheets

ADSORPTION TYPE COOLING APPARATUS, METHOD OF CONTROLLING COLD OUTPUT OF SAME, AND FIN TYPE ADSORBENT HEAT EXCHANGER FOR USE IN THE SAME

FIELD OF THE INVENTION

This invention relates to an adsorption type heat exchanger utilizing for cooling operation the coolant adsorbing and desorbing functions of a solid adsorbent, a method of controlling the cold output of the same cooler, and a fin type adsorbent heat exchanger used for the same cooler. More particularly, the invention concerns an adsorption type cooler, which has high COP (coefficient of product), can suppress variations of the adsorption efficiency of adsorbent and can provide stable cold blast for long time.

PRIOR ART

Adsorption type coolers which utilize the coolant adsorbing/desorbing function of a solid adsorbent for cold generation or heat pump operation, have many advantages such as the capability of effectively utilizing low class heat sources (at 50° to 85° c.), for instance plant waste heat, hot water obtainable with solar heat collectors or the like, etc. and also less movable parts of compressors and the like, low equipment cost, less operating noise, etc. compared to compressor type coolers.

This type of adsorption type cooler usually uses water, alcohol, etc. as coolant, and employs a plurality of juxtaposed adsorbent heat exchangers accommodating a solid adsorbent, such as silica gel, zeolite, active carbon, active alumina, etc. In operation, adsorption and desorption of the coolant to and from the adsorbent are caused repeatedly while supplying the low class heat source for regeneration and the cooling water alternately to the heat exchanger. Thus, the evaporation latent heat of the coolant is utilized to obtain cold load output.

FIG. 8 shows the structure of an adsorption type cooler, to which the invention is applied. This cooler comprises two adsorbent heat exchangers 1 and 2 accommodating a solid adsorbent, a condenser 7 coupled to the heat exchangers 1 and 2 via respective vapor discharge valves 3 and 4, an evaporator (or coolant tank) 9 coupled to the heat exchangers 1 and 2 via respective vapor suction valves 5 and 6, a load water duct line HI for outputting cold water while heat exchange with coolant is carried out in the evaporator 9, a cooling water supply duct line B for supplying cooling water for adsorbing coolant, having been evaporated through heat exchange with load water in the evaporator 9, to heat exchange tubes in the heat exchangers 1 and 2, a cooling water return duct line E for draining heat-absorbed cooling water having been passed through one of the adsorbent heat exchangers 1 and 2 to the outlet side, a heat source water supply duct line C for supplying regeneration heat source water to the heat exchange tube of the other one of the heat exchangers 1 and 2 that has sufficiently adsorbed coolant to cause the coolant to be evaporated and desorbed from the adsorbent, a heat source water return duct line D for draining the heat source water heat robbed through the desorption to the outlet side, and a condensing cooling water duct line A for heat robbing and condensing evaporated coolant having been evaporated in the desorbing operation noted above and led into the condenser 7 through the vapor discharge valves 3 and 4.

The adsorbent heat exchangers 1 and 2 are housed in a vacuum housing 33 and isolated from each other by a partitioning wall 34, and they are capable of normal temperature evaporation of the coolant which is constituted by alcohol and water. The same structure and principles apply to the case where three or more adsorbent heat exchangers are employed.

The cooling water supply duct line B is branched from the condensing cooling water duct line A, which is coupled via a pump 23 to the heat exchange tube 8 in the condenser 7 and thence to the downstream side of the cooling water return duct line E.

Designated at 15 is an inlet valve assembly comprising four valves for switching supply duct lines. That is, the valve assembly is used to switch the cooling water supply duct line B and the heat source water supply duct line C to bring about an adsorbing and a desorbing process of the adsorbent heat exchangers 1 and 2 alternately.

Designated at 19 is an outlet valve assembly comprising four valves for switching return duct lines. That is, like the above inlet valve assembly, this value assembly is used to switch the cooling water return duct line E and the heat source water return line D to corresponding ones of the adsorbent heat exchangers 1 and 2.

Designated at 13 is a coolant duct line extending between the condenser 7 and the evaporator 9. Through this duct line 13, condensed, i.e., liquid, coolant which has been obtained through heat robbing with cooling water in the condenser 7, is led via a valve 14 to the evaporator 9.

Designated at 10 is a coolant re-circulating duct line for leading liquid coolant stored in the evaporator 9 to a scatterer 12b to heat rob load water supplied to the heat exchange tube 12a in the evaporator 9 with latent heat of evaporation in FIG. 3.

Designated at 24, 29 and 11 are fluid pumps provided on respectively associated fluid duct lines, and at 25 is an on-off valve provided on the associated fluid duct line.

In this technique, when using the heat exchanger 1 for the adsorbing process and the other heat exchanger 2 for the desorbing process, the valves 15a and 15d of the inlet valve assembly 15 are opened while closing the other valves 15b and 15c thereof, and the valves 19c and 19b of the return duct line side outlet valve assembly 19 are opened while closing the other valves 19a and 19d thereof. Further, of the vapor suction valves 5 and 6 only the one on the side of the heat exchanger 1 in the adsorbing process is opened, and of the vapor discharge valves 3 and 4 only the one on the side of the heat exchanger 2 in the desorbing process is closed.

As a result, evaporated coolant obtained as a result of cooling and heat robbing by load water in the evaporator 9, is led through the vapor suction valve 5 into the heat exchanger 1 in the adsorbing process. At this time, cooling water is supplied through the valve 25, pump 24 and valve 15a to the heat exchanger 1, and thus the evaporated coolant is adsorbed to the adsorbent in the heat exchanger 1. The cooling water that has been heated through the adsorption is drained through the valve 19c to the outside.

Meanwhile, in the other heat exchanger 2 in the desorbing process, heat source water is supplied through the pump 26 and valve 15d to the heat exchanger 2, and coolant having been adsorbed to the adsorbent is desorbed and evaporated to be led through the vapor discharge valve 4 to the condenser 7.

In the condenser 7 which the condensing cooling water duct line A makes the cooling water supply duct line B branch, the evaporated coolant noted above is condensed by condensing cooling water led through the pump 23 to the heat exchange tube 8 in the condenser 7, the condensed, i.e., liquid, coolant being stored therein.

The liquid coolant thus stored in the condenser 7 is led through the coolant duct line 13 and valve 14 to the evaporator 9.

The liquid coolant led into the evaporator 9 is re-circulated through the coolant re-circulating duct line to be supplied through a scatterer to the heat exchange tube in the evaporator 9 to rob heat of load water, whereby cold output can be obtained from the load water duct line H leading from the evaporator 9.

After coolant has been sufficiently adsorbed to the adsorbent in the heat exchanger 1 in the adsorbing process, the valves 15a and 15d of the supply duct line side inlet valve assembly 15 are closed while opening the other valves 15b and 15c thereof, and the valves 19b and 19c of the return duct line side outlet valve assembly 19 are closed while opening the other valves 19a and 19d thereof. Further, the vapor suction valves 5 and 6 and vapor discharge valves 3 and 4 are switched.

As a result, the adsorbing and desorbing processes in the heat exchangers 1 and 2 are switched over to each other for the same adsorbing and desorbing operations as described above.

In the above adsorption type cooler which uses a solid adsorbent, unlike an absorption type cooler which uses a liquid absorber/wetter as absorbent and thus readily permits continuous control of the cold output (i.e., load) by varying absorbing and wetting conditions according to the circulation amount or temperature of the liquid absorber/wetter, once temperature conditions of the adsorption and desportion are determined, the coolant adsorption and desorption amounts in the heat exchangers 1 and 2 are determined absolutely by such conditions.

Besides, in one batch adsorbing cycle under a condition that a constant quantity of cooling water is circulated through the adsorbent heat exchangers 1 and 2, the adsorbing capacity of the adsorbent is not fixed; it is high right after the start of the cycle and reduced toward the end thereof. Therefore, unless the amount of adsorbed vapor is controlled to be constant during this time, the cold water outlet temperature is subject to variations.

Further, when a reduced capacity is required due to a change in load side utility condition, it is necessary to make adsorbing coolant vapor control in order to maintain the load water outlet temperature of the evaporator 9 at a predetermined constant temperature.

FIG. 9 shows changes in the evaporator inlet/outlet cooling water temperature in the operation of the above adsorption type cooler. As described before, right after the switching of the adsorbing and desorbing processes in a batch cycle, the adsorbing capacity of the adsorbent is high, and there is a tendency for coolant vapor adsorption from the evaporator 9 to match the state of the adsorbent at this time.

In the initial stage of the cycle time as shown at T1, T2, T3, . . . in FIG. 9, in which the coolant vapor adsorption amount is large, the evaporator inlet/outlet load water temperature is lower than predetermined temperature (which is, in this instance, 14° and 9° c. of the load water at the inlet and outlet, respectively, of the evaporator 9).

With the progress of the adsorption, the adsorbing capacity is reduced, the cooling water outlet temperature rises gradually, and for last several minutes of the cycle time during which the capacity of the adsorbent approaches a limit, the capacity is higher than the preset value and near 14° c., the load water temperature at the inlet of the evaporator 9.

Such great difference of the adsorbing capacity of the adsorbent at the start and end of the batch cycle time, leads to variations of the load water at the outlet of the evaporator 9.

Further, even in an intermediate part of the batch cycle, a reduction of the load causes the cooling water to enter the evaporator 9 at a temperature below 14° c. and leave the evaporator 9 at a temperature below 9° c.

For this reason, the prior art cooler as described above, which is subject to great cold water temperature variations, is usually used with a buffer water tank for uniformalizing the water temperature.

Even with this structure, however, when the cold water temperature at the inlet of the evaporator 9 becomes lower than 10° c. due to a load reduction, the pressure of the coolant is reduced at the time of adsorption to reduce the amount of coolant that is driven. Therefore, not only the efficiency is reduced, but also with temperature reduction to 0° c. or below condensation takes place, leading to the possibility of the disability of operation or the breakage of the heat transfer tube of evaporator 9.

To permit continual operation in case of a load reduction, it has been proposed, as described in Japanese Patent Laid-open Publication No. Hei 3-7859, to delay the cycle time of the alternate adsorbing and desorbing processes such as to meet the required capacity of the cooler; specifically, the cycle time of the adsorbing and desorbing is prolonged compared to that in the full load condition as shown in, for instance, batch cycle times T1', T2', . . . in FIG. 9, the capacity being controlled on the basis of this time delay. This type of method, however, can not cope with cases where the load is varied with occurrence of both the full and partial load conditions in the batch.

There is a different method, in which, instead of varying the batch cycle time, the rate of flow or temperature of the heat source water for regeneration is controlled such as to reduce the adsorbing capacity at the time of the adsorbent regeneration. In this case, however, what is controlled is the possible amount of adsorption in the next batch cycle of the adsorbent heat exchanger in the desorbing process. In other words, no consideration is given in the method to load variations in the prevailing adsorbing process cycle.

Accordingly, it has been proposed, in Japanese Patent Laid-open Publication No. Hei 5-272833, a technique in which a vapor suction valve is provided between an evaporator on a load cold water duct line and an adsorbent heat exchanger such that it is capable of opening control according to a detection signal from a load cold water temperature sensor provided on the outlet side the evaporator. The vapor suction valve is adapted to control the amount of coolant vapor supplied from the evaporator to the adsorbent heat exchanger in the adsorbing process according to the detected load cold water temperature.

With such a technique, it is possible to suppress load cold water temperature variations in the batch cycle through control of the flow rate of vapor to either adsorbent heat exchanger 1 or 2 in the adsorbing process according to the load cold water temperature. However, it is necessary to use an expensive controller for the flow rate control other than the vapor suction valve on-off operation, thus increasing the overall cost.

Meanwhile, in the above adsorption type cooler, the adsorbent heat exchangers themselves have their own problem.

Specifically, the solid adsorbent is heated or cooled by cold or hot water in the heat exchange tube for heat exchange. However, unlike the heat exchange between usual fluids, heat transfer is effected through point contact between the solid (in many cases in the form of spheres) and the heat exchange tube and contact between solids. Therefore, it is considerably difficult to improve the heat transfer efficiency, and a great deal of generating surfaces are necessary.

Meanwhile, where spaces enclosed by heat exchange tube are filled with adsorbent, the coolant vapor that is adsorbed or desorbed by the adsorbent has to pass through the interstices of the adsorbent and encounters resistance offered as it passes. It is therefore difficult to obtain sufficient performance.

For this reason, the above heat exchange tube has a structure as shown in Japanese Patent Laid-open Publication No. Sho 62-91763, in which circular fins made of aluminum or the like and having a specified height are provided at a predetermined pitch around the heat exchange tube through which heat medium passes, the spaces defined between adjacent fins are filled with adsorbent, and each heat exchange tube is covered for the entire tube length with a metal net made from very thin wires to prevent detachment of the adsorbent.

This structure, however, has drawbacks that it requires a large number of heat exchange tubes to secure necessary amount of adsorbent meeting the capacity of the heat exchanger and also that the heat exchange tube arrangement including end tube support places to which the heat exchange tubes are secured is determined by also including a coolant vapor duct line to lead coolant vapor at the time of the adsorption and desorption, thus increasing the size of the heat exchanger including all the heat exchange tubes.

Besides, in this type of adsorbent heat exchanger the heat exchange tubes are fabricated one after another, thus leading to cost increase.

To overcome this drawback, a structure as shown in FIG. 12 has been proposed. In this case, a plurality of horizontally extending heat exchange tubes 140 are disposed one above another. Also, a large number of plate-like aluminum fins 141 are fitted at a predetermined interval on the vertical array of the heat exchange tubes 140, and the spaces adjacent filled with granular adsorbent 142. To prevent the adsorbent 142 from being detached from the fin surface and inter-fin spaces and also movement of the adsorbent, the fin array is covered with a thin metal net 143 made of very thin wires (of about 40 meshes, for instance, although the mesh size depends on the grain size).

In this technique, however, the metal net of very thin wires which is used to cover the fins from the outer side for preventing the detachment of the adsorbent, is just like thin cloth and can not be held in close contact with the fins by itself. Therefore, it is necessary to hold the metal net from the outer side with coarse mesh expand metals or the like to increase the close contact of the net.

However, even with such expand metals or the like it is considerably difficult to increase the close contact of the thin metal net uniformly over the entire surface of the filled adsorbent. Accordingly, such after-measure as making the expand metals locally taut are adopted to eliminate strain. However, this inevitably requires considerable man-hour.

Besides, the use of expand metals or like comparatively tough reinforcement to hold the metal net from the outer side, increases weight, ineffective heat capacity and necessary heat when regenerating and cooling the adsorbent, thus deteriorating the COP.

Further, when the adsorbent heat exchanger in the prior art shown in FIG. 12 is required to have high capacity, it assembled by stacking a plurality of adsorbent heat exchangers of an increased size. However, the increased size adsorbent heat exchanger is subject to flexing of the metal net due to its own weight, thus resulting in detachment of the adsorbent from the fins or movement of the adsorbent.

In addition, when the element heat exchangers are raised or moved during assembling, local flexing of the metal net takes place to produce a gap between the metal net and the fin array, thus causing small particles of the adsorbent to fall down.

Moreover, since the prior art shown in FIG. 12 adopts the structure that the thin metal net is covered with the expand metals after covering the fin array with the metal net, the manufacture requires long time, substantial scale merits can not be obtained in view of the cost of manufacture and performance, and it is difficult to reduce cost and greatly improve performance.

SUMMARY OF THE INVENTION

An object of the invention is to provide an adsorption type air cooler, which has high COP and is operable steadily for long time, and a heat output control method for the same air cooler.

Another object of the invention is to provide an adsorption type cooler, which is simple in structure, uses no expensive controller, and nevertheless permits, load cold water, i.e., cold output (load) in each batch cycle to be maintained constant irrespective of variations of input load led to an evaporator.

A further object of the invention is to provide a fin type adsorbent heat exchanger, which can be manufactured readily and at low cost and can also readily provide scale merits.

A still further object of the invention is to provide a fin type heat exchanger, which can greatly increase the efficiency of regeneration and cooling of adsorbent to improve the COP compared to that in the above prior art without possibility of great reduction of the mobility of the adsorbent that might otherwise result from detachment of the adsorbent from the fin array or movement of the adsorbent.

According to the invention, as claimed in claim 1, in order to control the cooling capacity widely and to stabilize the cold output of load water, it is sought to control the temperature and/or flow rate of cooling water for removal of the heat of adsorption so as to control the adsorbing capacity of the adsorbent.

In the prior art, when vapor coolant produced as a result of heat exchange with load water in a coolant tank functioning as an evaporator is adsorbed in an adsorbent heat exchanger, cooling water for removing the heat of adsorption is circulated at a predetermined temperature and a predetermined flow rate that are determined by normal environmental conditions. According to the invention, the temperature and flow rate of cooling water for the adsorption heat removal is controlled artificially according to the cold output of load water by utilizing heated cooling water after the adsorption heat removal, heat source water, etc. More specifically, the cold output after heat exchange with the coolant is detected, and the temperature and flow rate of cooling water on the cooling water supply duct line side is controlled according to the detected signal, while supplying, to the cooling water supply duct line, one or more different kinds of hot water, i.e., heated cooling water having passed through a heat exchanger in an adsorbing process, heat source for regeneration, cooled heat source water having passed through a heat exchanger in a desorbing process, and heated cooling water having absorbed the heat of condensation of the coolant, thus controlling the capacity of the adsorbent heat exchanger in the adsorbing process during the batch cycle in correspondence to the load heat exchanged in the evaporator.

According to the invention as claimed in claim 5, it is sought to provide a cooler which can suitably attain the above invention. The cooler features means for detecting the cold output of load water after heat exchange with coolant, specifically means for detecting the cold output of load water having passed through the coolant tank functioning as evaporator, and a supply duct line for supplying, to the side of cooling water supply duct line leading to a heat exchanger in the adsorbing process, one or more different kinds of hot water, i.e., heated cooling water having passed through the heat exchanger in the adsorbing process, regenerating heat source water, cooled heat source water having passed through the heat exchanger in the desorbing process, and heated cooling water having absorbed the heat of condensation of coolant, while also featuring a control valve provided on at least either one of the supply, cooling water and heat source water duct lines and opening or on-off controlled according to the detection signal from the detecting means.

Suitably, the cooler further comprises an inlet valve for selectively communicating a heat source water supply duct line and a cooling water supply duct line alternately to the plurality of heat exchangers, and an outlet valve for selectively communicating the cooling water and heat source water return duct lines alternately to the heat exchangers.

Suitably, the cooler further comprises a bypass duct line for providing a bypass between the cooling water or heat source water return duct line on the downstream side of the outlet valve and the cooling water supply duct line on the upstream side of the inlet valve, and a bypass control valve to be opening or on-off controlled according to the detection signal from the detecting means.

As will be described later, where only the heating of cooling water supplied to the heat exchanger in the desorbing process is controlled, it is necessary only to supply heat source water in the desorbing process to the cooling water. However, as noted above, the heat source water is at a temperature around 50° to 85° c., which is greatly high compared to the temperature of the cooling water which is 15° to 35° c., and therefore its stringent temperature or flow rate control is impossible.

Accordingly, according to the invention there is or are prepared one or more, suitably three, different kinds of heated or heat source water, among heated cooling water having passed through the heat exchanger in the adsorbing process, regenerating heat source water, cooled heat source water having passed through the heat exchanger in the desorbing process, and heated cooling water having absorbed the heat of condensation of coolant, and its or their amount or amounts added to cooling water is or are suitably controlled according to the detected temperature or flow rate of the cold output. It is thus possible to obtain finer control.

As for the control valve for suitably controlling the amount of hot water to be added to cooling water, instead of using an independent control valve such as the bypass control valve as noted above, four valves which constitute an inlet or outlet valve may be suitably on-off controlled according to the detection signal as will be described later.

Further, as will be described later, efficiency heat recovery at the time of the switching of adsorption and desorption, may be obtained by providing a heat source water bypass duct line for direct bypassing between the heat source water supply and return duct lines and a bypass control valve for on-off controlling this bypass duct line.

A technique using a bypass duct line as according to the invention, is proposed in, for instance, Japanese Patent Laid-open Publication No. Hei 5-322359.

The proposed technique will be described briefly with reference to FIG. 11. When a first adsorber 120 executes an adsorbing process while a second adsorber 121 executes a desorbing process, valves V1, V4 and V5 are opened while holding valves V2 and V3 closed.

In consequence, vapor coolant obtained as a result of cooling by the latent heat of evaporation in a cooling vessel 122 under reduced pressure, is cooled in the first adsorber 120, whereby heat exchange with load water is effected.

Meanwhile, heating under reduced pressure is done in the second adsorber 121 through heat exchange with hot water. Coolant which has been adsorbed to the adsorbent is thus desorbed to enter a condenser 123, and condensed water produced therein is returned to the cooler 122.

When the above process is completed, it is switched by on-off switching control of the valve for continual cooling. However, the temperature is low when the adsorbing process in the first adsorber 120 is completed, while it is high when the desorbing process in the second adsorber 121 is completed. Therefore, whenever each process is switched, the heat capacity difference between the two adsorbers becomes exhaust heat, thus resulting in a heat loss.

Accordingly, in the above prior art technique, a bypass duct line 134 is provided to bypass the coolant duct line between the two adsorbers 120 and 121, and a heat recovery process is provided to recover the exhaust heat by providing thermal balance between the two adsorbers with the valves V1, V2 and V5 closed and the valves V3 and V4 opened.

The heat recovery process (A) which is brought about at the time of the switching of the adsorbing and desorbing processes, is shown by bold lines (A) in FIG. 9. Thus, the COP is improved by the provision of this process.

The above prior art technique, however, seeks to recover heat at the time of the switching of the adsorbing and desorbing processes, and does not intend to maintain constant load cooling water, i.e., cold output (load) in each batch cycle of adsorbing and desorbing processes.

Further, the bypass duct line is not the bypass duct line 134 for bypassing the coolant duct line between the two adsorbers 120 and 121, but is for the bypass between the cooling water or heat source water supply and return duct lines.

Further, the bypass duct line in the prior art is opened only for the heat recovery process that is brought about when the adsorbing and desorbing processes are switched over each other. That is, unlike the present invention, it is not on-off controlled according to the detection signal from the detecting means in the adsorbing or desorbing process. Thus, the present invention is set apart from the prior art not only in the basic structure but also in the objects and functions.

Of course, the bypass duct line according to the invention can be utilized for the heat recovery process as well, as will be described later.

The invention is applicable to either of two cases, i.e., a case in which the load water duct line is led through the coolant tank to provide for heat exchange with the coolant in the coolant tank, thereby outputting load cold, and a case in which the coolant is led out from the coolant tank to be evaporated in load heat exchanger so as to utilize the latent heat of evaporation for load cold generation.

According to the invention as claimed in claim 6, a coolant tank and a load heat exchanger are provided as separate units. Specifically, a load cooler is provided which cools the load while causing partial evaporation of the coolant through heat exchange between liquid coolant supplied from the coolant tank through a pump and the load, the mixture fluid of the liquid coolant and the vapor coolant after the heat exchanger in the load cooler being returned to the coolant tank for separation of gas and liquid, a cold accumulating material being accommodated in the coolant tank.

According to such invention, according to which the coolant tank and load cooler are provided as separate units, in the event of temperature variations taking place in the coolant tank, heat exchange with load can be obtained with the latent heat of evaporation of coolant that is made use of regardless of the temperature variations. It is thus possible to obtain load heat at a constant temperature.

Thus, when the invention is applied to an air conditioner, the load air for air conditioning is cooled directly in the load cooler by the latent heat of evaporation of the liquid coolant to become cold air. It is thus possible to set the temperature of evaporation of the coolant to be as high as about 10° to 15° c. even in case where the brown-out cold air is at the temperature in the prior art, i.e., about 18° c. Thus, the COP can be increased to contribute to energy saving. Further, the coolant that is forced as liquid into the condenser may be at a temperature higher than that of the conventional adsorption type air cooler, and ordinary urban supply water or industrial water may be used as coolant.

In this case, with the cold accumulating material accommodated in the coolant tank, it is possible to stabilize the temperature of the coolant. Further, instead of providing the cold accumulating material as described above, a throttle valve may be provided on the duct line for leading liquid coolant from the condenser to the coolant tank for liquid coolant temperature control by utilizing liquid coolant obtained through flushing from the throttle valve.

At the time of the switching of the two adsorbent heat exchangers, one of them has been heated by heated fluid passed through it, while the other adsorbent heat exchanger has been cooled by cooled fluid passed through it. When the heat exchangers are switched in this state, the heated one is cooled by the cooled fluid while the cooled one is heated by the heated fluid, thus resulting in waste of heat energy to lower the COP.

Accordingly, it is suitable to connect the heat exchange tubes of the two adsorbent heat exchangers via a switching valve so as to let the cooled and heated fluids passed through the heat exchange tubes in the heat exchangers be mixed together after the end of the adsorbing process in one of the heat exchangers, thus providing an average temperature (heat recovery process). Thus, the amount of heat for heating required for the other adsorbent heat exchanger can be reduced to one half compared to the case where the cooled and heated fluids are not mixed, thus obtaining corresponding improvement of the COP.

It may be thought that the liquid coolant supplied to the air cooler becomes insufficient even during a short period of the mixing process, for instance a couple of minutes. Accordingly, a cold accumulating material capable of accumulating cold may suitably be provided in the coolant tank to let the cold accumulated during this time be released to the liquid coolant in the coolant tank. By so doing, it is possible to suppress the temperature rise of the liquid coolant, thus preventing great variations of the cold air temperature and permitting cold air at a comfortable temperature to be supplied steadily. The cold accumulating material used according to the invention may be either non-latent or latent cold accumulating material. The latent cold accumulating material that is to be used suitably has a melting point in a temperature range of 0° to 15° c. Examples of cold accumulating material are an ice accumulating material sealed in a capsule and cold accumulating material model "T-41" or "T-47" sold by Transfuse Systems Inc.

In lieu of providing the cold accumulating material the amount of liquid coolant in the coolant tank, i.e., the retention time of the coolant, may be made greater than the amount of circulated coolant to obtain the same effects.

Further, the same effects are obtainable by causing flushing of coolant through a throttle valve, and this permits further improvement of the COP.

The invention as claimed in claim 9 concerns a fin type heat exchanger. FIG. 13 shows such a heat exchanger. As shown, the heat exchanger comprises a plurality of vertically stacked unit heat exchangers 100, each of which includes a plurality of heat exchange tubes 94 arranged in a row, a large number of plate-like fins 92A which are fitted at a predetermined interval on and made integral with the heat exchange tubes 94, a granular adsorbent 93 filling the spaces between adjacent plate-like fins 92A, and an adsorbent detachment prevention metal net 95a, 95b provided on each of the upper and lower surfaces of the array of the plate-like fins 92a, and elastic members 96 each interposed between adjacent ones of the unit heat exchangers 100, the elastic members 6 being a good heat conductor, capable of being passed by fluid and capable of applying elastic force to the associated metal nets 95a and 95b substantially over the entire area thereof.

Suitably, fine mesh expand or punching metal members 97 are provided on the bottom surface of the adsorbent detachment prevention metal net 95a of the lowermost unit heat exchanger or on the top surface of the metal adsorbent detachment prevention net 95b of the uppermost unit heat exchanger.

The elastic member 96 is suitably a wavy sheet-like coarse mesh grating body made from spring wires.

With these technical means, the eventual overall structure can be assembled simply and quickly by taking the pitch interval of the units and movement and detachment prevention of the adsorbent when stacking each unit heat exchanger 100.

Further, with each elastic member 96 sandwiched between adjacent unit heat exchangers 100 such as to provide retained reaction force of spring, the pitch interval of the wavy sheet engaging the fin arrays of the upper and lower unit heat exchangers 100 via the metal nets 95a and 95b is set approximately to 3 cm. Thus, when the overall adsorbent heat exchanger is completed, the metal nets 95a and 95b can be held in close contact with the surfaces of the arrays of the fins 92 to prevent movement or fall-off of the adsorbent filling the spaces between adjacent fins.

Furthermore, only a single elastic member 96 is needed for two, i.e., an upper and a lower, unit adsorbent heat exchangers 100. Further, by making the elastic members 96 from spring wires, it is possible to reduce the resistance offered at the time of the adsorption and desorption of vapor as well as the specific heat and heat capacity of the elastic members 96.

Moreover, the elastic member 96 sandwiched between adjacent unit heat exchangers 100 may have low apparent specific heat and low weight, it permits reduction of ineffective heat at the time of the regeneration and cooling. It is thus possible to improve the COP of adsorption type coolers.

Thus, with the above technique, when the overall structure has been assembled, each unit heat exchanger 100 is free from movement of the adsorbent 93 or detachment thereof from the fin array 92A. Further, unlike the prior art structure using retainer members individually provided for respective fin arrays 92A, it is sufficient to provide only a single elastic member 96 between adjacent unit heat exchangers 100. It is thus possible to reduce weight and heat capacity.

BEST MODES OF CARRYING OUT THE INVENTION

The invention will hereinunder be described exemplarily and in detail in conjunction with some embodiments with reference to the drawings. It is to be construed that unless particularly specified the sizes, materials, shapes and relative dispositions of the described constituent parts of the embodiments have no sense of limiting the scope of the invention but are merely exemplary.

The history until completion of the invention will now be briefly described.

As described before, according to the invention it is sought to control the temperature and/or flow rate of cooling water for removing the heat of adsorption through control of the adsorbing capacity of the adsorbent for wide scope control of the cooling capacity and stabilization of the cold output of load water.

There are two different methods for the control.

In one of the methods, the flow rate of cooling water is controlled on the side of heat exchanger inlet or outlet.

In the other method, both the temperature and flow rate of cooling water supplied to a heat exchanger in an adsorbing process are controlled by adding heated cooling water, heat source for regeneration or cooled heat source water having passed through the heat exchanger in the desorbing process to the cooling water for the adsorption.

Figure 1:
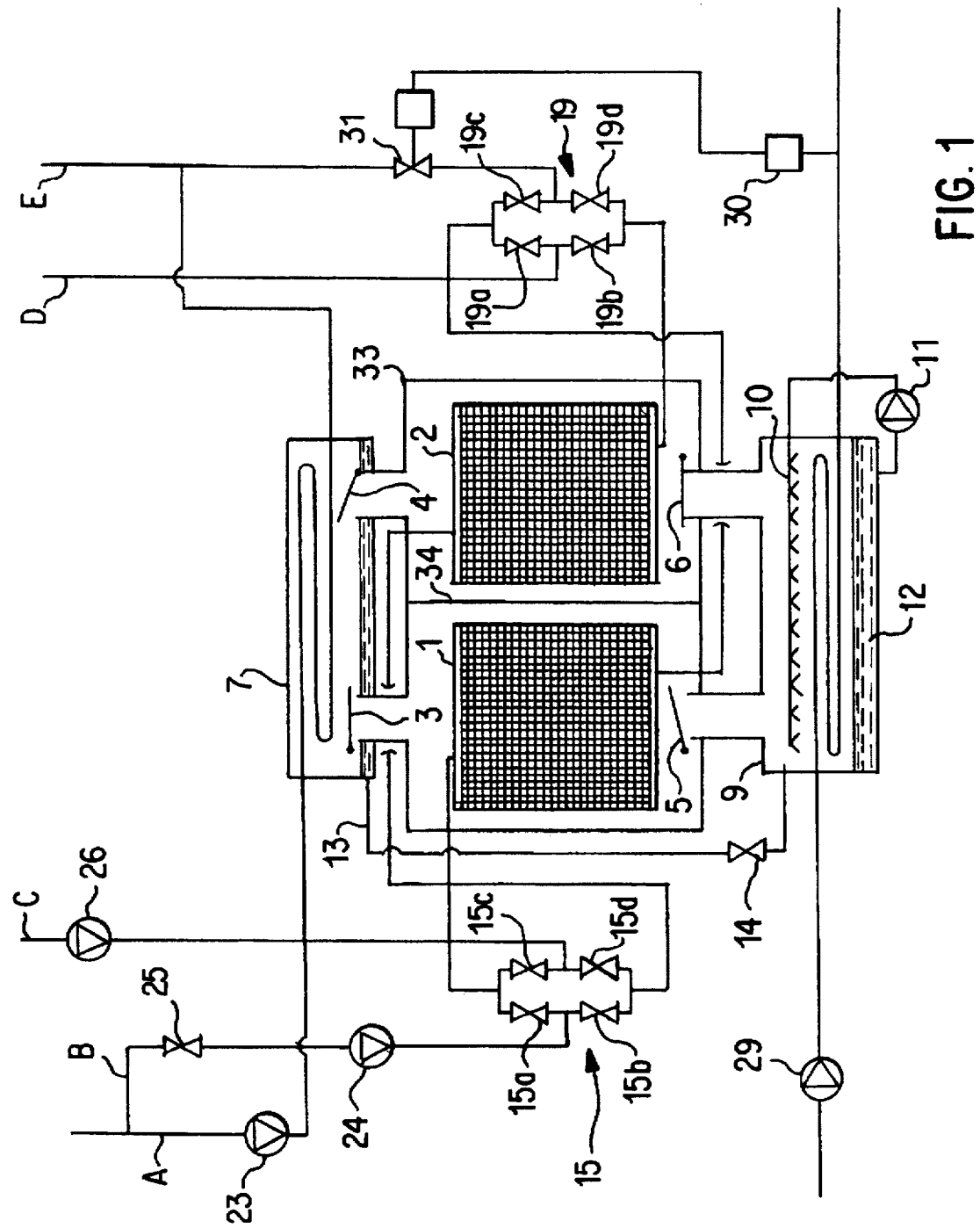
FIG. 1 is a circuit diagram showing the overall circuit of an embodiment of the adsorption type cooler with an exclusive control valve provided on the side of a cooling water outlet according to the invention as claimed in claims 1 to 5.

FIG. 1 shows an embodiment of the invention for carrying out the former method. In this system, on a load water duct line H on the side of the outlet of a coolant tank 9 serving as an evaporator, a temperature sensor 30 is provided to detect the temperature of load water having passed through the coolant tank 9. Also, on a cooling water return duct line E on the downstream side of an outlet valve 19, a flow rate control valve 31 is provided for flow rate control (i.e., valve opening control or flow rate control by intermittent on-off operation) according to a detection signal from the temperature sensor 30.

With this arrangement, when the load water temperature detected by the temperature sensor 30 becomes higher than a predetermined temperature, the opening of the flow rate control valve 31 is increased to increase the flow rate of cooling water, and conversely the opening is reduced to reduce the flow rate when the load water temperature detected by the temperature sensor 30 becomes lower than the predetermined temperature. In this way, it is possible to suppress variations of the load water temperature.

However, in an initial stage after the switching of the desorbing process over to the adsorbing process, the adsorbent heat exchangers 1 and 2 are at the temperature of the desorbing process side after heat recovery, i.e., at the temperature of the heat source water. Under this condition, the adsorbing efficiency is low, and therefore the heat exchange efficiency in the coolant tank 9 is low. Therefore, the cold output temperature of the load water on the side of the outlet of the coolant tank 9 is higher than the predetermined temperature (of 9° c.).

The temperature sensor 30 is set such that it detects this so that according to a detection signal from it the opening of the flow rate control valve 31 is increased to increase the flow rate of cooling water.

With the cooling water flow rate increase the temperature of the adsorbent heat exchanger 1 is reduced. When the adsorbent temperature is ultimately reduced to the temperature of the cooling water, the heat exchanger 1 provides the maximum capacity. That is, several seconds after the end of the heat recovery, the heat exchanger 1 comes up to provide the maximum capacity. This means that when the load water temperature is quickly reduced to be lower than the predetermined temperature, it is necessary to control the heat exchanger 1 in correspondence to the load changes from the maximum capacity state toward the stoppage by fully closing the flow control valve 31. The control, therefore, is liable to be unstable.

Figure 2:
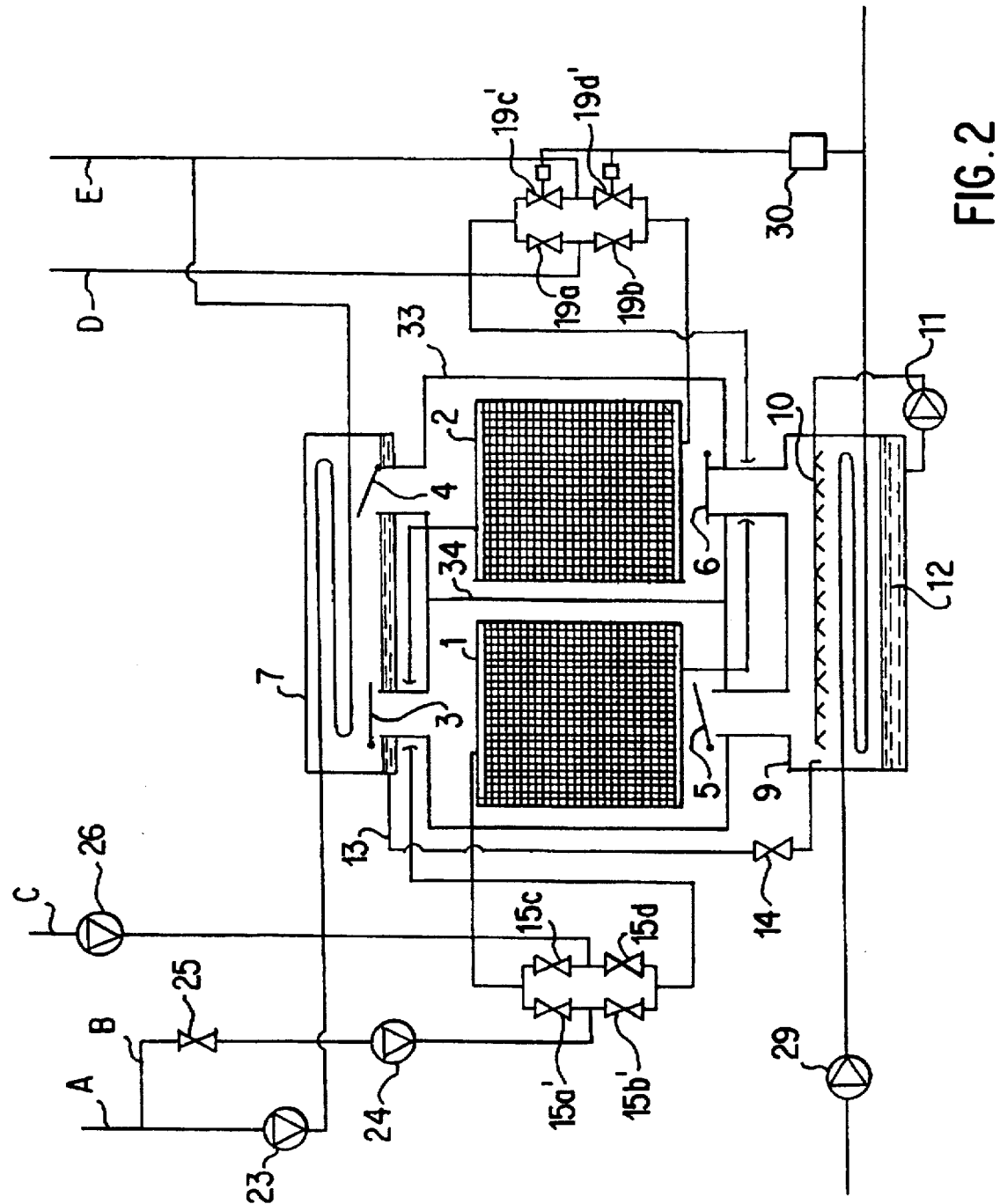
FIG. 2 is a circuit diagram showing the overall circuit of another embodiment of the adsorption type cooler with a cooling water outlet valve for controlling the flow rate of cooling water according to the invention as claimed in claims 1 to 5.
Figure 3:
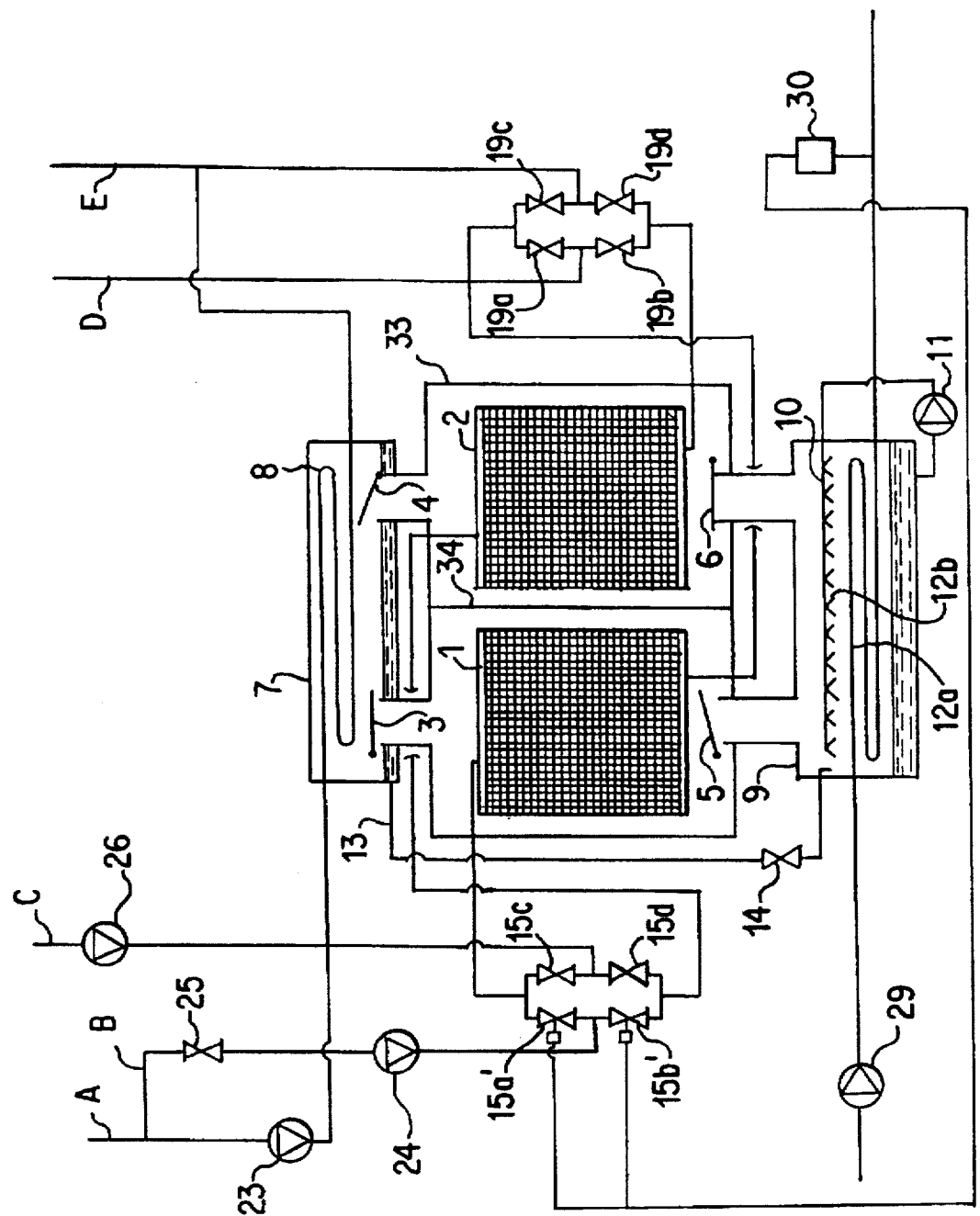
FIG. 3 is a circuit diagram showing the overall circuit of a further embodiment of the adsorption type cooler with a cooling water inlet valve for controlling the flow rate of cooling water according to the invention as claimed in claims t to 5.

Similar drawback is prone in the case of FIG. 2 or 3, in which the flow rate control valve 31 is replaced with an arrangement that cooling water switching valves 15'a and 15'b of inlet valve assembly 15 for turning on and off the supply cooling water or cooling water switching valves 19'c and 19'd of outlet valve assembly 19 for tuning on and off the return cooling water have own opening control property for cooling water control according to the detection signal from the temperature sensor 30. That is, in either of these cases, whenever the process switching mode is set up, it is required to quickly bring the switching valve assembly 15 or 19 from the fully open state to the fully closed or a nearly fully closed state. This operation is unstable. In addition, because of the alternate operation of the heat exchangers 1 and 2, it is necessary to use the two switching valve assemblies 15 and 19 as control valves, thus leading to high cost.

Figure 4:
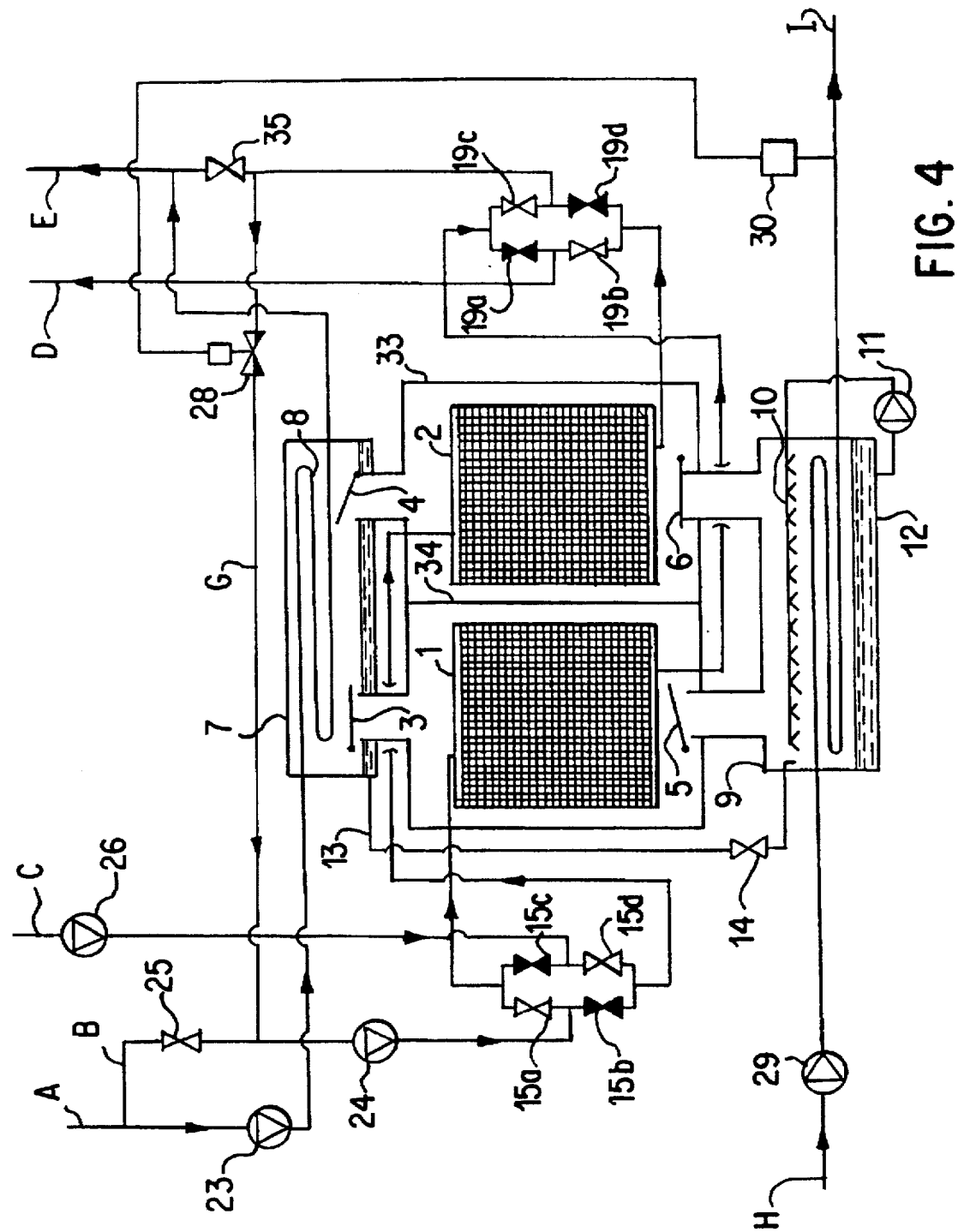
FIG. 4 is a circuit diagram showing the overall circuit of a still further embodiment of the adsorption type cooler with a bypass control valve provided on a bypass duct line according to the invention as claimed in claims 1 to 5.
Figure 5:
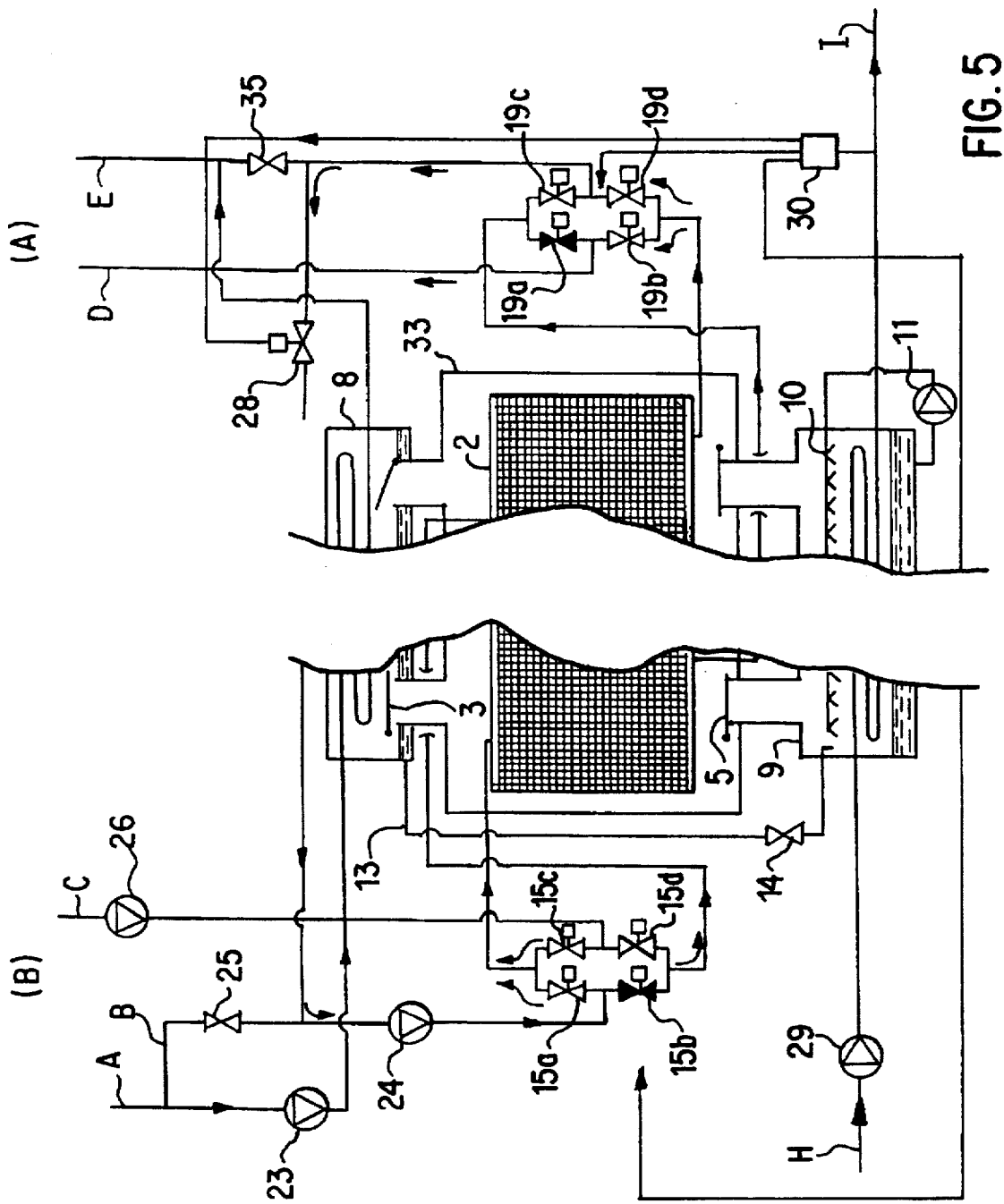
FIG. 5 shows modifications of the operation of the embodiment shown in FIG. 4, showing in (A) load water control by supplying cooled heat source water having passed through heat exchanger in a desorbing process to the side of a supply duct line for supplying cooling water and in (B) load water control by supplying heat source water to the cooling water supply duct line side.
Figure 6:
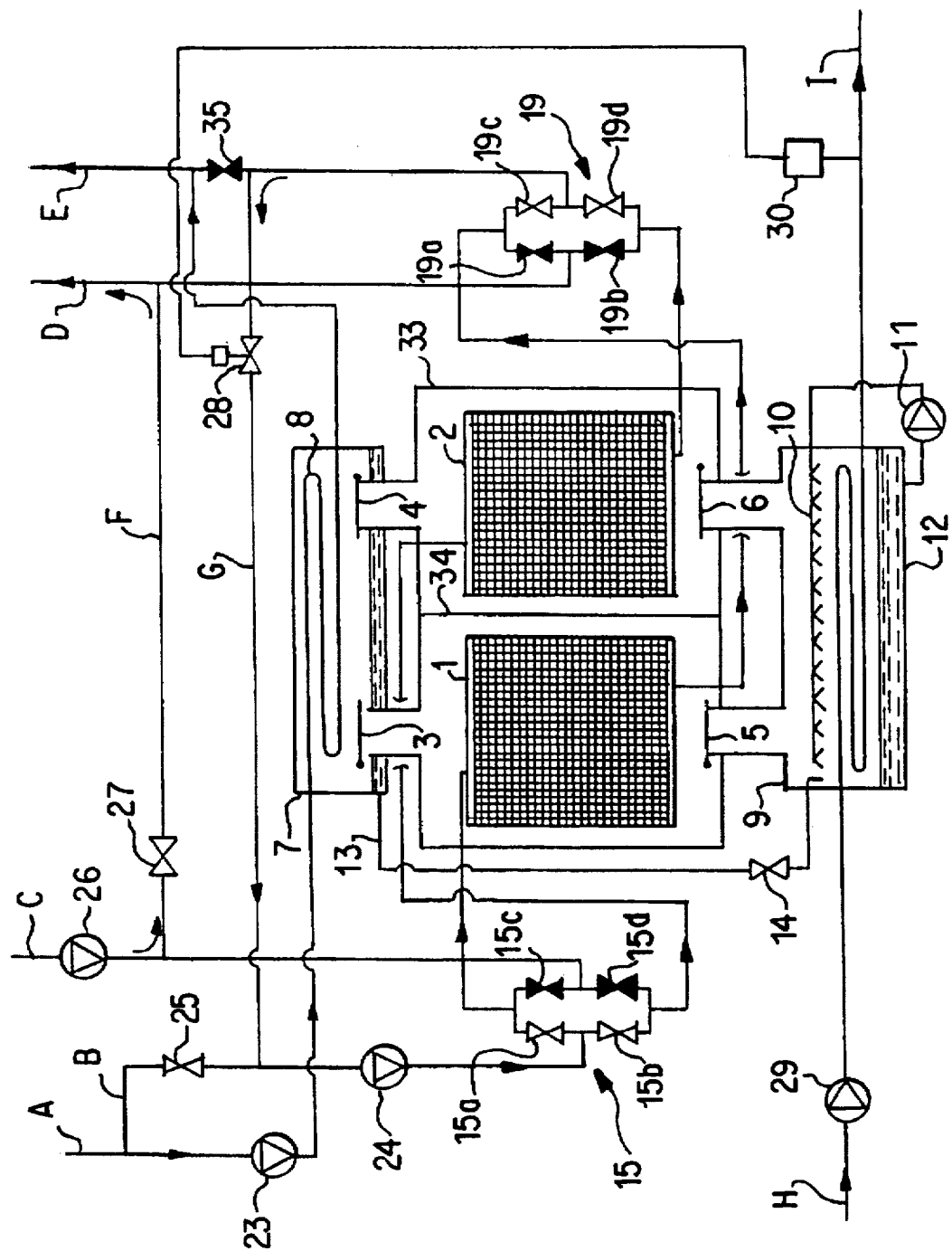
FIG. 6 shows the on-off status of a valve in a heat recovery state in a further embodiment of the invention as claimed in claims 1 to 5, in which a heat source water bypass duct line for direct bypass between heat source water supply and return duct lines and a bypass control valve for on-off controlling the bypass duct line are provided for efficient heat recovery.

What is shown in FIGS. 4 to 6 is intended to preclude the above drawback. The system shown in FIG. 4 is for carrying out a method of controlling both the temperature and flow rate of cooling water led to the adsorbent heat exchanger 1 which is in the adsorbing process by appropriately adding heated cooling water having passed through the heat exchanger 1 to the cooling water for the adsorption. In this instance, a bypass duct line G is provided for the bypass between cooling water supply duct line E on the downstream side of outlet valve assembly 19 and cooling water return duct line B on the upstream side of inlet valve assembly 15, and on the bypass duct line G a bypass control valve 28 is provided such that it is opening and/or on-off controlled according to the detection signal from temperature sensor 30.

Further, a valve 35 is provided on the bypass duct line G between positions thereof on the side of cooling water return duct line E and on the side of duct line A for leading cooling water for condensation.

With this arrangement, when the load water temperature detected by the temperature sensor 30 exceeds the predetermined temperature, the bypass control valve 28 is fully closed according to the signal from the temperature sensor 30, thus allowing sole cooling water to be supplied to the adsorbent heat exchanger 1 in the adsorbing process. The adsorbing efficiency thus can be improved. When the load water temperature detected by the temperature sensor 30 becomes lower than the predetermined temperature, on the other hand, the bypass control valve 28 is opened to pass heated cooling water through the bypass duct line G to the supply side so as to increase the temperature of cooling water supplied to the heat exchanger 1 in the adsorbing process, thus reducing the adsorbing efficiency. Thus function has a particular effect that efficient load water cold output control is obtainable even in the initial stage after the switching of the desorbing process over to the adsorbing process.

In greater detail, in the initial stage after the switching of the desorbing process over to the adsorbing process, the adsorbent heat exchanger 1 is at the temperature of the desorbing process side after the end of the heat recovery, i.e., at the temperature of the heat source water. That is, in this stage the adsorbing efficiency is low, and thus the efficiency of heat exchange in the coolant tank 9 is low. Under this condition, the load water cold output temperature on the outlet side of the coolant tank 9 is higher than the predetermined temperature (9° c.).

The temperature sensor 30 detects this temperature, and according to its detection signal the bypass control valve 28 is fully closed to pass low temperature cooling water only.

With the supply of this cooling water, the temperature of the adsorbent heat exchanger 1 is reduced, and when the adsorbent temperature is reduced down to the temperature of the cooling water, the heat exchanger 1 provides the maximum capacity.

When the temperature of the heat exchanger 1 approaches the cooling water temperature, adsorption commences suddenly, causing the temperature of load water at the evaporator outlet to approach the predetermined temperature. If the cooling water is passed continually, the evaporator outlet load water temperature becomes lower than the predetermined temperature. In the instant system, the bypass control valve 28 is opened according to the signal from the temperature sensor 30, which detects the temperature of load water at the outlet of the coolant tank 9, thus causing increased temperature cooling water emerging from the cooling water outlet valve 19c to be returned through the bypass control valve 28 and bypass duct line G so as not to become lower than the predetermined temperature. In this way, the temperature of cooling water supplied to the adsorbent heat exchanger 1 is controlled.

Toward the cycle end the adsorbing capacity of the adsorbent turns to reduce. At this moment, low temperature cooling water is passed to provide for adsorbing capacity because of that the bypass control valve 28 is fully closed. In this way, it is possible to steadily maintain the load water temperature at the outlet of the evaporator 12 because of that the bypass control valve 28 is fully closed.

Now, the manner of changes of the load water temperature at the outlet and inlet of the evaporator will be described with reference to FIG. 10.

As described before, in this embodiment of the adsorption type cooler, with a load reduction as noted above a control signal is obtained from the outlet load water temperature sensor 30 to control the bypass control valve 28 on the cooling water bypass duct line G so as to control the temperature of cooling water passing through the adsorbent heat exchangers 1 and 2, thus obtaining cold output control.

Figure 10:
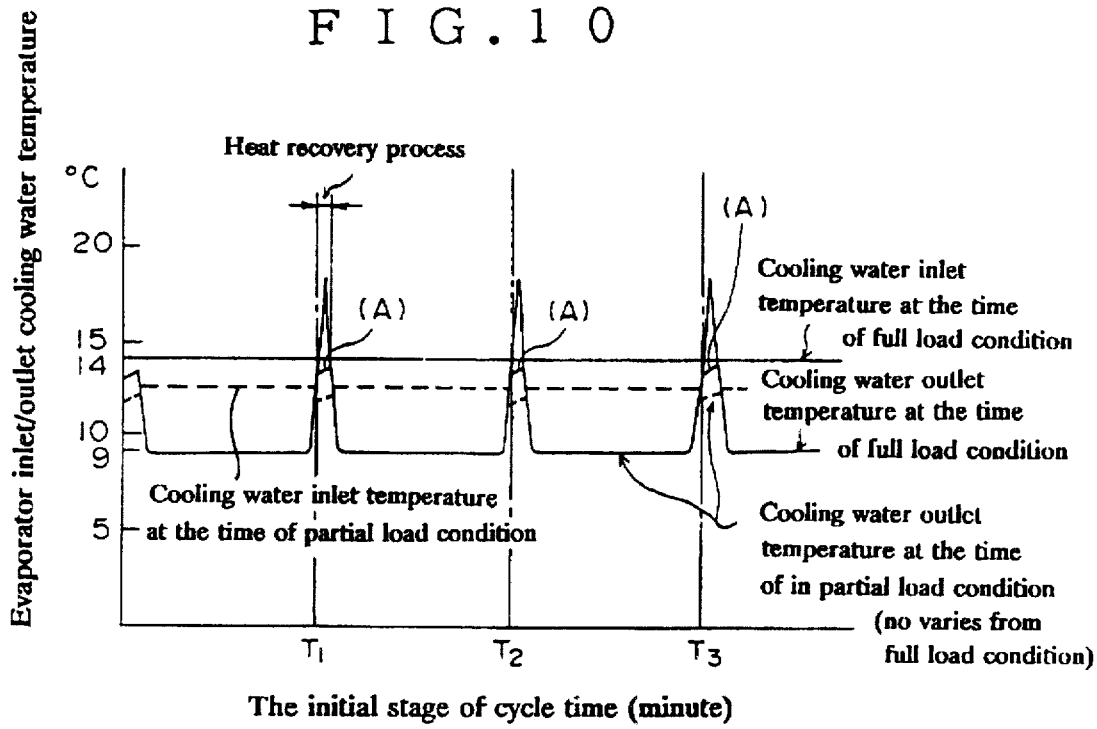
FIG. 10 is a graph showing the temperatures of load water at evaporator inlet and outlet in an embodiment of the invention as claimed in claims 1 to 5.

More specifically, when the temperature of load water at the outlet of the coolant tank 9 is going to be lower than 9° c. in cycle times T1, T2, . . . , as shown by solid line in FIG. 10, the opening of the bypass control valve 28 is controlled in the opening direction in correspondence to that temperature according to the signal from the outlet load water temperature sensor 30, thus causing the heated cooling water having passed through the adsorbent heat exchanger 1 to be returned to the inlet side. Thus, the temperature of cooling water passing through the heat exchanger 1 is increased for vapor coolant amount control. The load water cold output temperature thus does not become lower than the predetermined temperature.

In other words, unlike the case in which the adsorbing capacity is reduced toward the end of the adsorbing cycle due to adsorption of a great amount of vapor coolant in an initial stage of the cycle, it is possible to maintain an average adsorbing capacity and substantially eliminate load water cold output variations.

Further, even when the temperature of load water at the inlet of the coolant tank 9 becomes lower than 14° c. due to reduction of load water led to the coolant tank 9, stable operation can be ensured because of inlet cooling water temperature control by the bypass control valve 28 such as to control the outlet load water temperature to a predetermined value at all times.

For this reason, in FIG. 10 the temperature changes can be seen only right after the cycle switching.

Further, for several seconds right after the cycle switching from the commencement of adsorption of vapor coolant by the adsorbent till the reduction of the load water temperature to the predetermined temperature, stable operation is ensured after the reduction of the outlet load water temperature to the predetermined temperature. Thus, the buffer water tank may be of reduced volume compared to the prior art, or it may be dispensed with depending on the arrangement.

The water which is to be added to the cooling water for adsorption, may not be heated cooling water; for example, it is possible to use heat source water for regeneration or cooled heat source water having passed through the adsorbent heat exchanger 1 or 2 in the desorbing process in dependence on the inlet valve switching control. Particularly, the heat source water for regeneration is at the highest temperature among different kinds of water to be added, and then the cooled heat source water having passed through the adsorbent heat exchanger 2 in the desorbing process. By suitably selecting these different kinds of water to be added, it is possible to obtain free and wide scale adsorbing efficiency control.

Shown in (A) in FIG. 5 is a method of controlling the temperature of cooling water supplied to the heat exchanger 1 in the adsorbing process by suitably adding cooled heat source water which has passed through the heat exchanger 2 in the desorbing process to the cooling water for the adsorption. In this case, as water to be added to the cooling water for the adsorption, cooled heat source water having passed through the heat exchanger 2 in the desorbing process can be re-circulated together with heated cooling water to the bypass duct line G by, for instance, opening the valves 19c and 19d of the output valve assembly 19 and closing the valves 19a and 19b thereof according to the detection signal from the temperature sensor 30.

Shown in (B) in FIG. 5 is a method of controlling the temperature of cooling water supplied to the heat exchanger 1 in the adsorbing process by suitably adding heat source water to the cooling water for the adsorption. In this case, cooled heat source water may be added directly to the cooling water for the adsorption by, for instance, opening the valves 15a and 15c of the inlet valve assembly 15 and closing the valves 15b and 15d thereof according to the detection signal from the temperature sensor 30.

Figure 11:
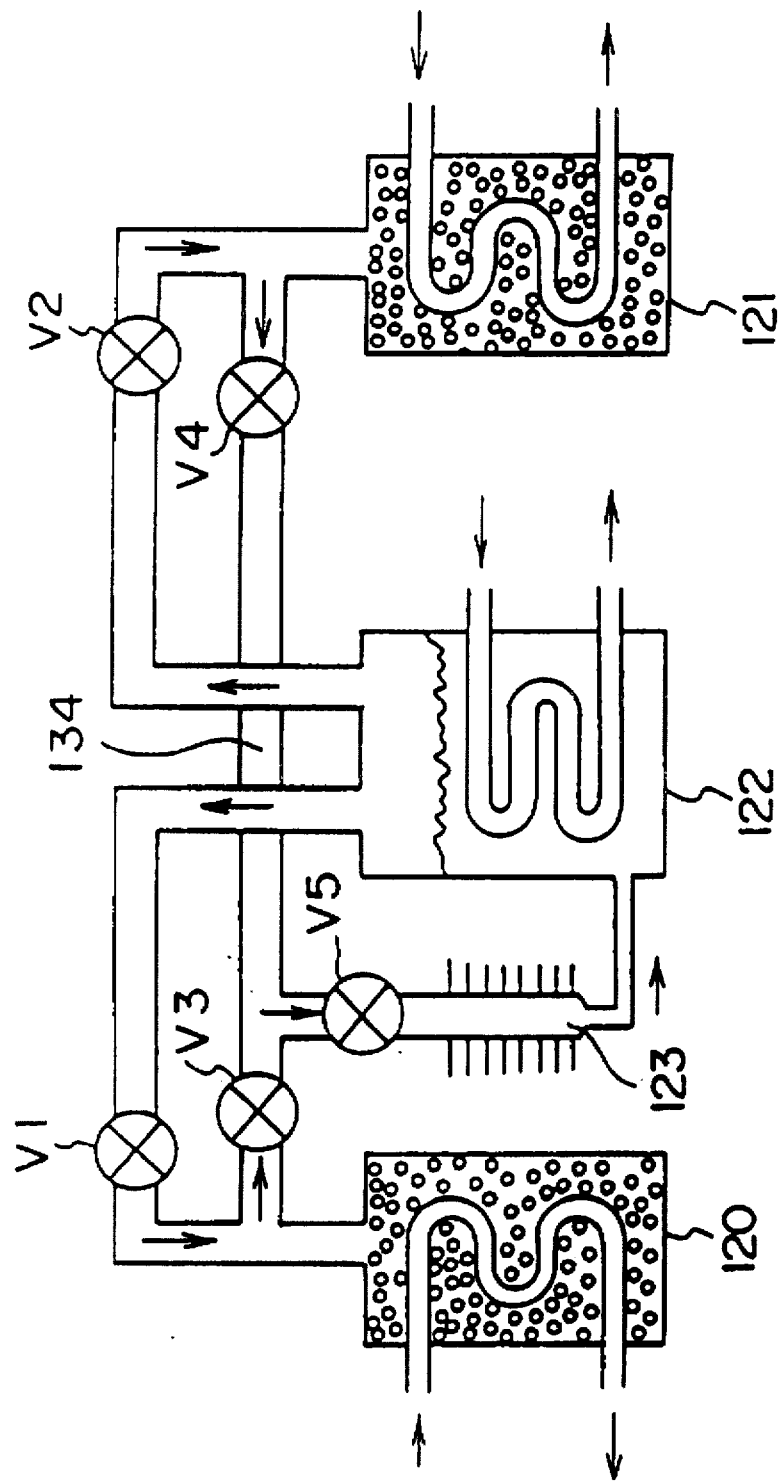
FIG. 11 is a circuit diagram showing the overall circuit of a prior art adsorption type cooler with a bypass duct line.
Figure 12:
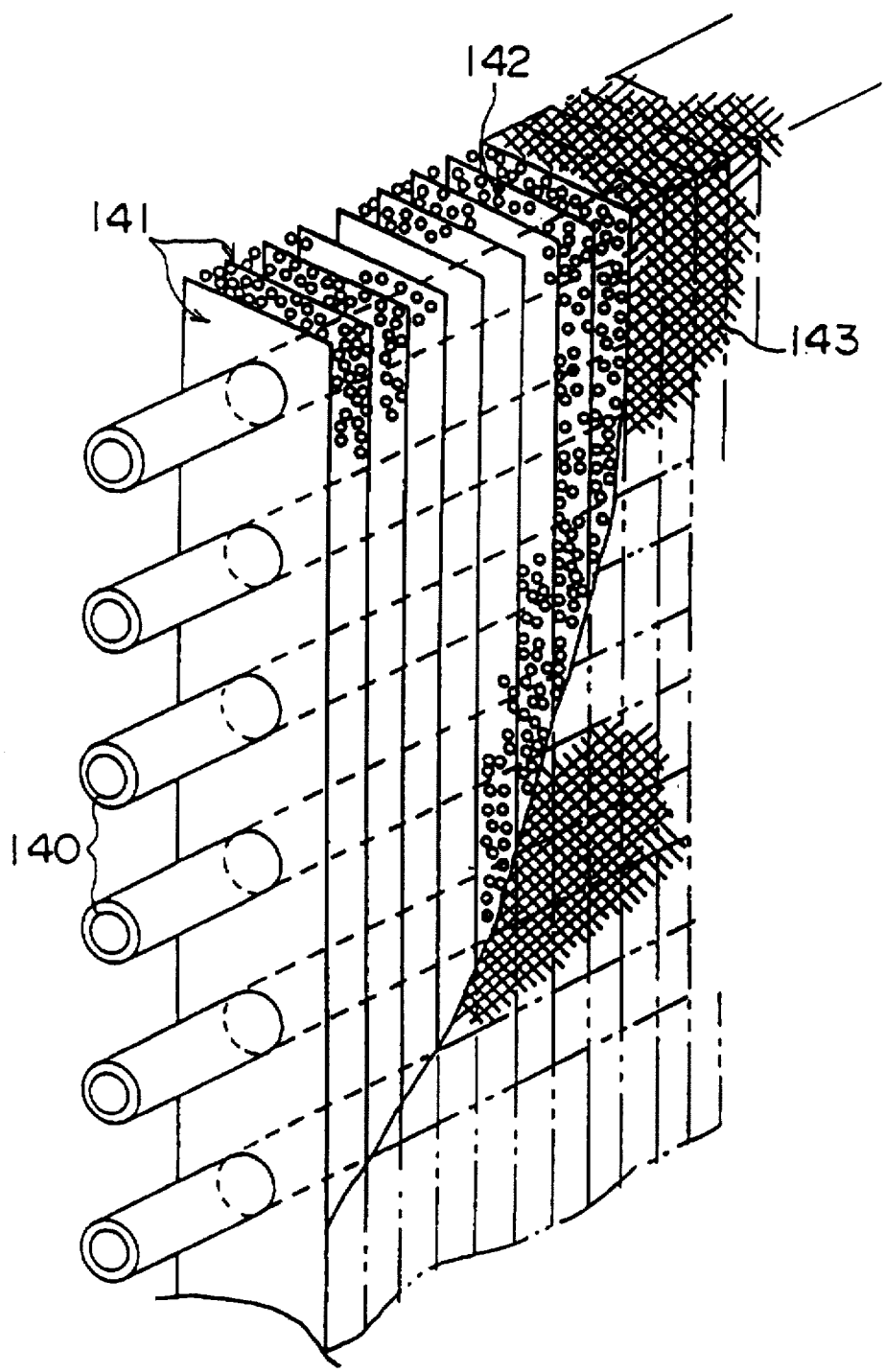
FIG. 12 is a perspective view showing the essential structure of a prior art adsorbent heat exchanger.

As in the prior art shown in FIG. 11, it is possible to let the bypass duct line G and bypass control valve 28 as a heat recovery duct line and a heat recovery valve, respectively, when switching the adsorbing and desorbing processes.

When the adsorbent heat exchanger 1 in the adsorbing process has adsorbed a certain amount of vapor coolant, it can no longer continue the adsorbing operation. On the other hand, the adsorbent heat exchanger 2 in the desorbing process is able to adsorb vapor coolant continually from the coolant tank 9 with the switching of the adsorbing and desorbing processes brought about by switching the vapor suction valves 5 and 6 and vapor discharge valves 3 and 4, because it has been in the desorbing process. At this time, the two adsorbent heat exchangers 1 and 2 are at their temperatures when they were in operation.

When load cold water is to be generated by switching the adsorbent heat exchangers 1 and 2, it is necessary to heat the heat exchanger 1 from the temperature of cooling water and, conversely, cool the other heat exchanger 2 from the temperature of heat source water. Therefore, the corresponding amount of heat of heating is wastefully exhausted.

FIG. 6 shows a method of saving the wasteful heat of heating. In this case, in addition to the bypass duct line G and bypass control valve 28 in the above embodiment, a second heat source water bypass duct line F for the bypass between heat source water supply and return duct lines C and D and a bypass control valve 35, for instance an electromagnetic valve, for turning the bypass duct line F on and off are provided. In addition, for connecting the hot water and cooling water duct lines in the adsorbent heat exchangers 1 and 2 in parallel, the valves 15a and 15b of the inlet valve assembly 15, valves 19c and 19d of the outlet valve assembly 19 and electromagnetic valve 27 are opened, and the valves 15c and 15d of the inlet valve assembly 15, valves 19a and 19b of the outlet valve assembly 19 and bypass control valve 35 are closed. In this state, the adsorbent heat exchangers 1 and 2 can recover heat through cooling water re-circulation pump 24 up to the average temperature. In this way, it is possible to save wasteful heat of heating, thus improving the COP.

The temperature in this heat recovery process is shown by bold lines (A) in FIG. 10.

In this operation, the bypass control valve 28 is substantially fully open while the adsorbent heat exchangers 1 and 2 does not yet have sufficient capacity right after heat recovery, then is operated in the closing direction with the lapse of the cycle time and is then brought to the fully open state again toward the end of the cycle time. This operation of the valve does not involve any sudden motion in opposite opening or closing direction. It is thus possible to ensure stable control operation.

Figure 7:
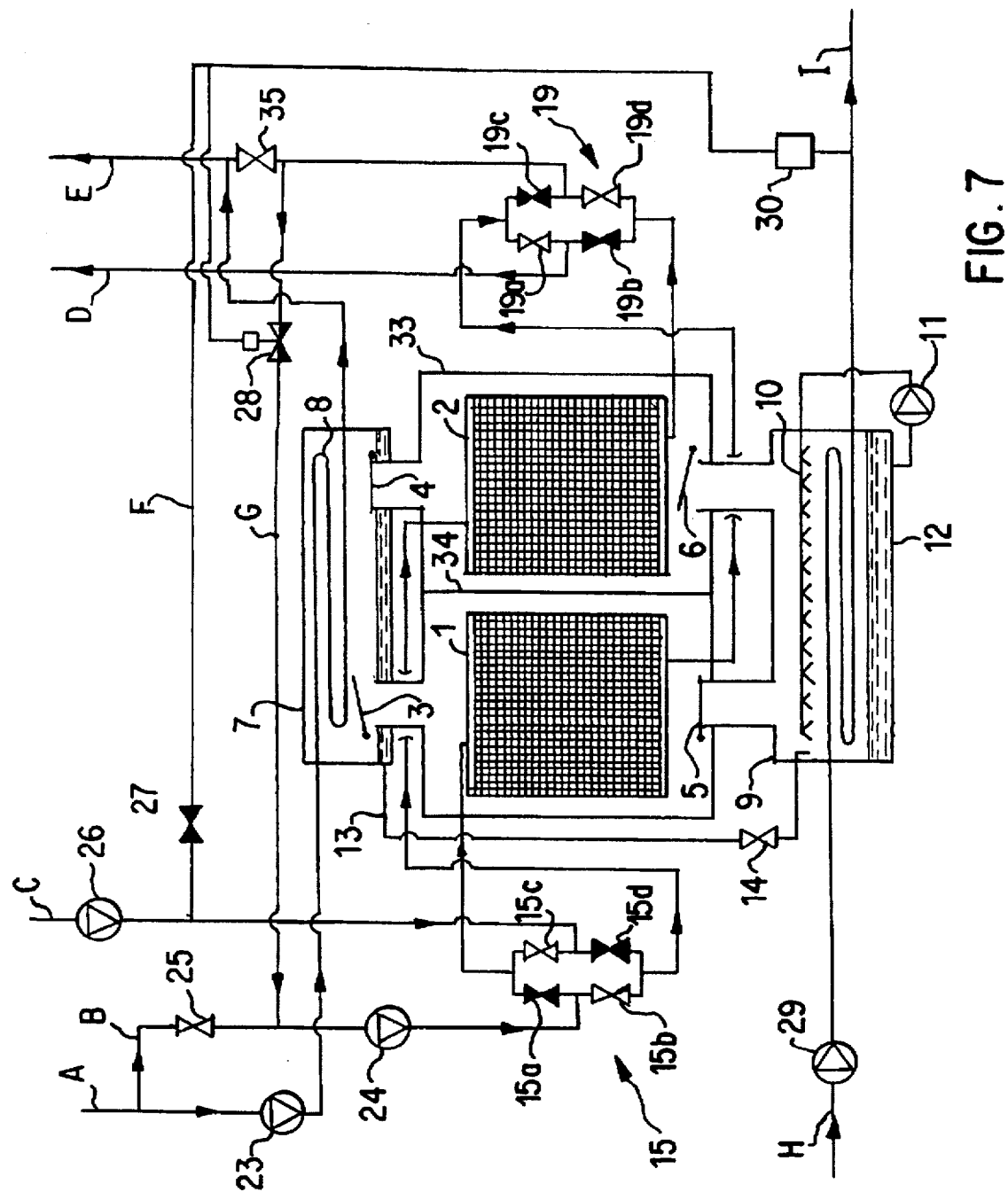
FIG. 7 shows the on-off status of the valve in the heat recovery process when adsorbing and desorbing cycle processes in FIG. 6 are switched over to each other.
Figure 8:
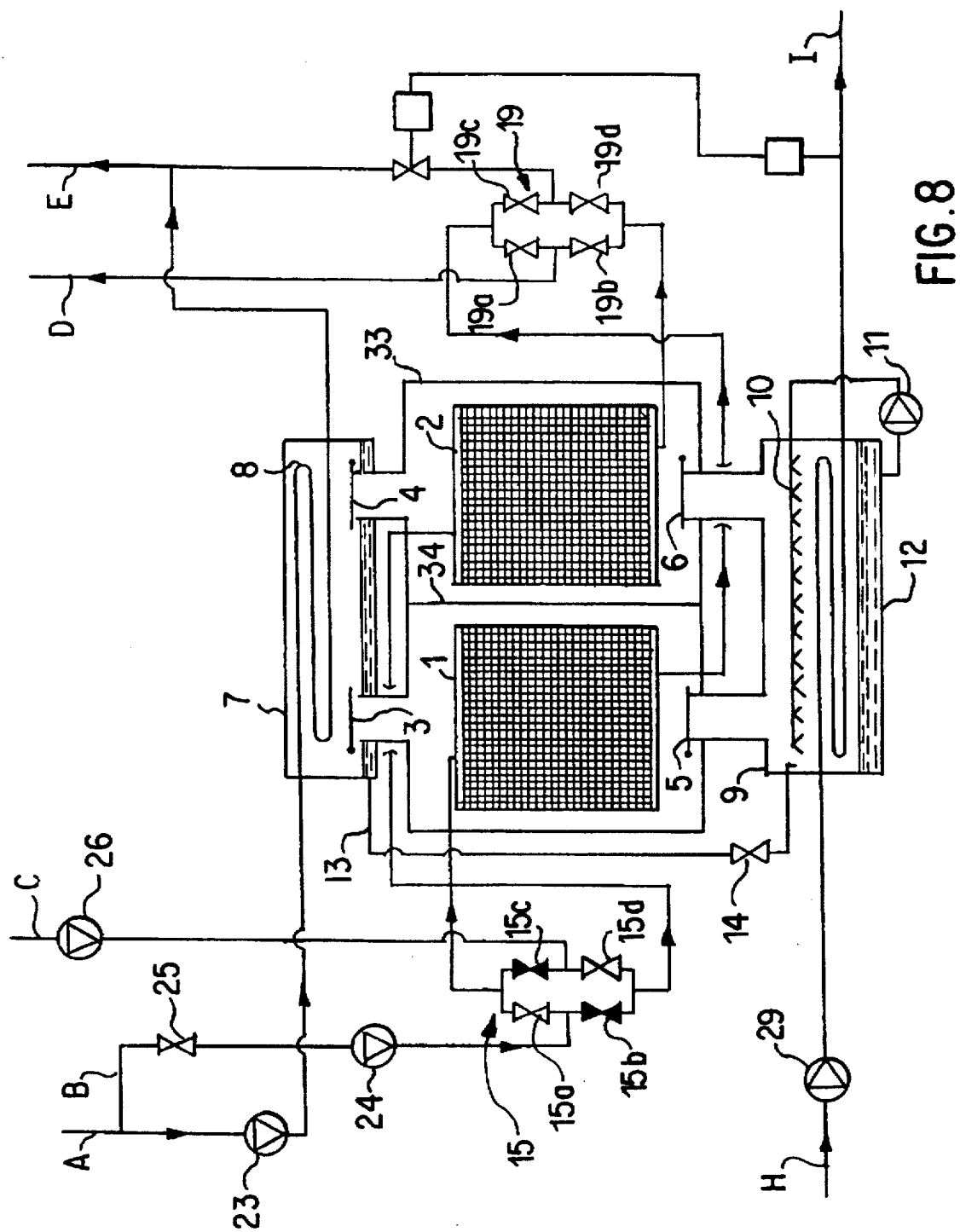
FIG. 8 is a circuit diagram showing the overall circuit of a prior art adsorption type cooler.
Figure 9:
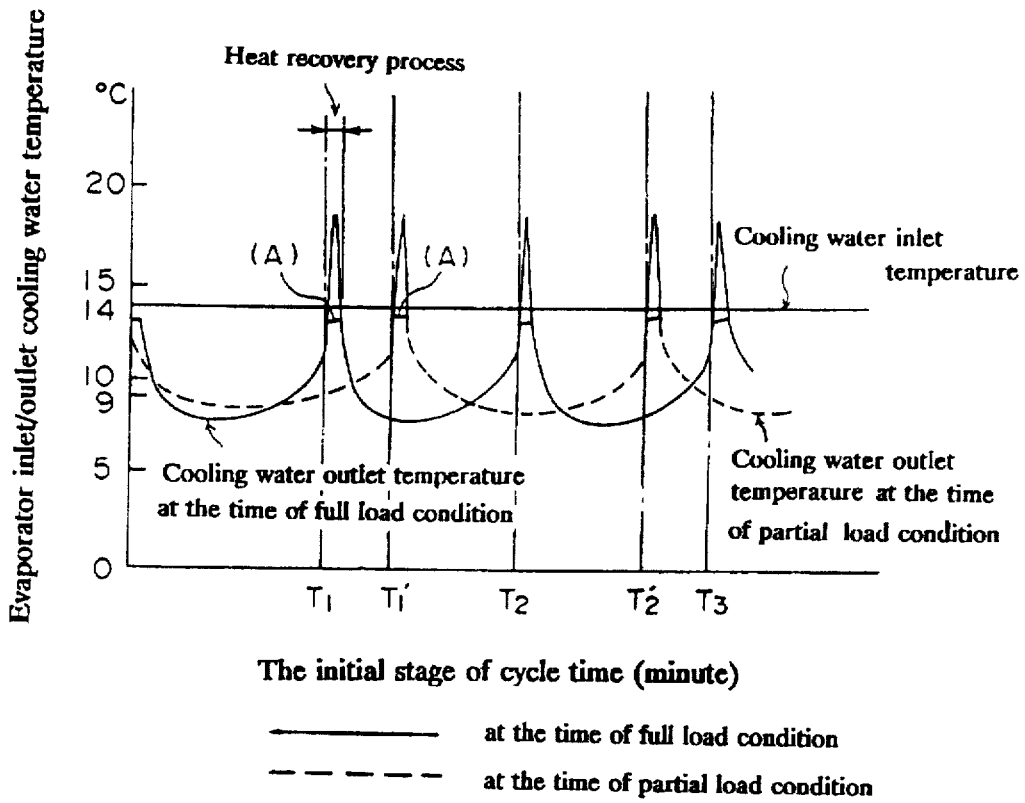
FIG. 9 is a graph showing the temperatures of load water at evaporator inlet and outlet in the prior art cooler shown in FIG. 8.

The heat recovery process is over in an about one minute, and as shown in FIG. 7, the adsorbing and desorbing processes are switched to provide load water cold output continually.

In this case, the valves, pump, etc. are operated in the same manner as in the operating mode shown in FIG. 4, but hot water and cooling water flow to the individual adsorbent heat exchangers 1 and 2 oppositely as shown by dashed arrow line.

As noted above, when the adsorbent heat exchanger 1 or 2 has adsorbed or desorbed a certain constant amount of vapor coolant, it no longer adsorbs or desorbs vapor. Accordingly, in order that one of the two heat exchangers is in adsorbing operation while the other is in desorbing operation, the adsorbing and desorbing operations are switched in an adequate cycle time of 5 to 15 minutes, or the operation is continued by providing a heat recovery process between adjacent cycles as shown in FIG. 6.

In this operation, the vapor suction valves 5 and 6, vapor discharge valves 3 and 4, cooling water inlet valves 15a and 15b outlet, valves 19c and 19d, heat source water inlet valves 15c and 15d and heat source water outlet valves 19a and 19b are controlled such that they are switched at the same timing.

Further, the vapor discharge valves 3 and 4, vapor suction valves 5 and 6, cooling water inlet valves 15a and 15b, valve 25, cooling water outlet valves 19c and 19d, valve 35, hot water inlet valves 15c and 15d, hot water outlet valves 19a and 19b, bypass control valves 27 and 28 and flow rate control valve 31, are forcibly opened and closed by actuators driven by air cylinders or electric motors.

Figure 15:
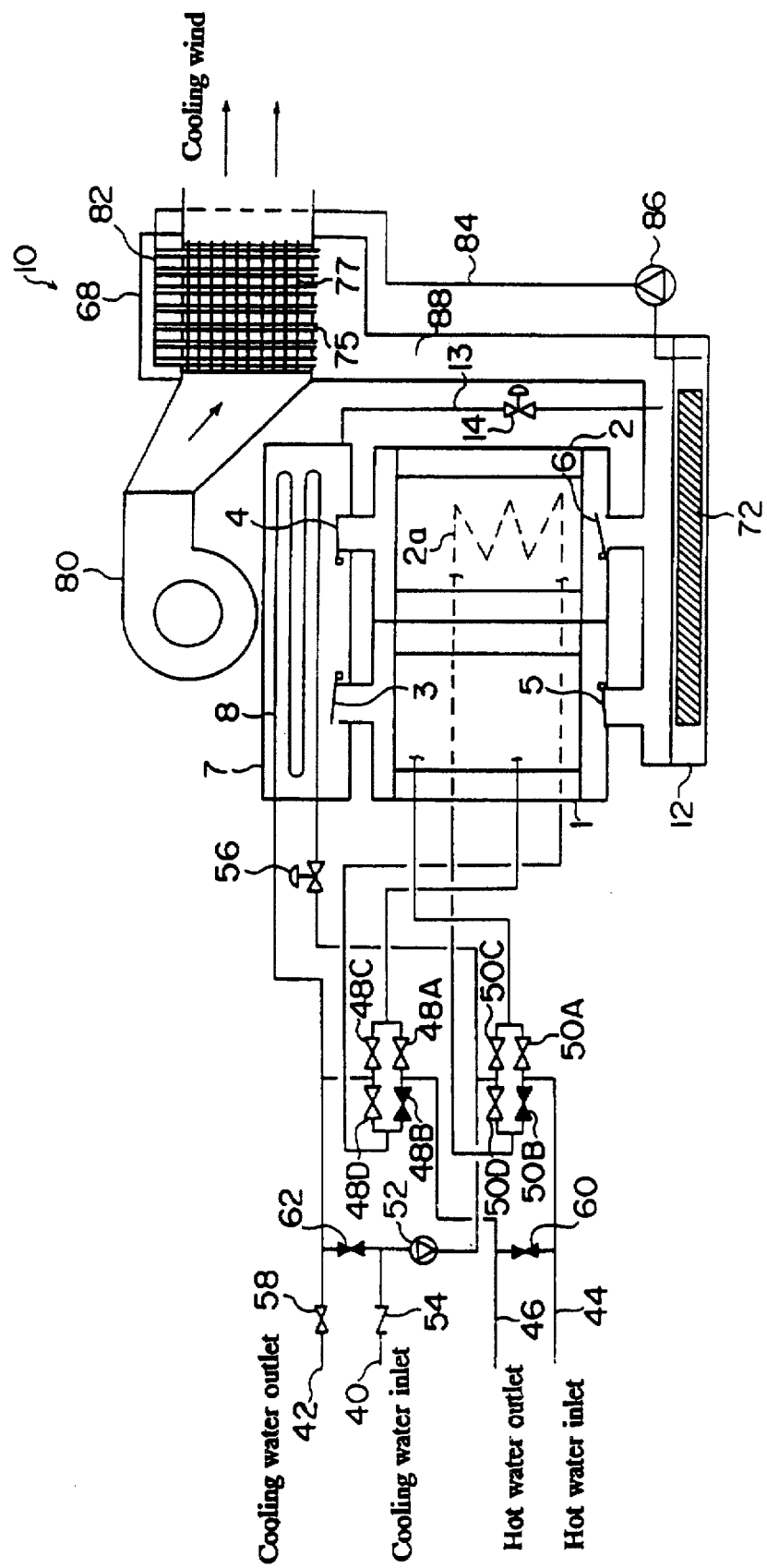
FIGS. 15 to 17 are circuit diagrams showing the overall circuit of an embodiment of the adsorption type cooler with a coolant tank and a load cooler provided as separate units according to the invention as claimed in claims 6 to 8, FIG. 15 showing a state with an adsorbing tank 1 in an adsorbing process and an adsorbing tank 2 in a desorbing process, FIG. 16 showing a state in a heat recovery process, and FIG. 17 showing a state with the adsorbing tank 2 in the adsorbing process and the adsorbing tank 1 in the desorbing process.
Figure 16:
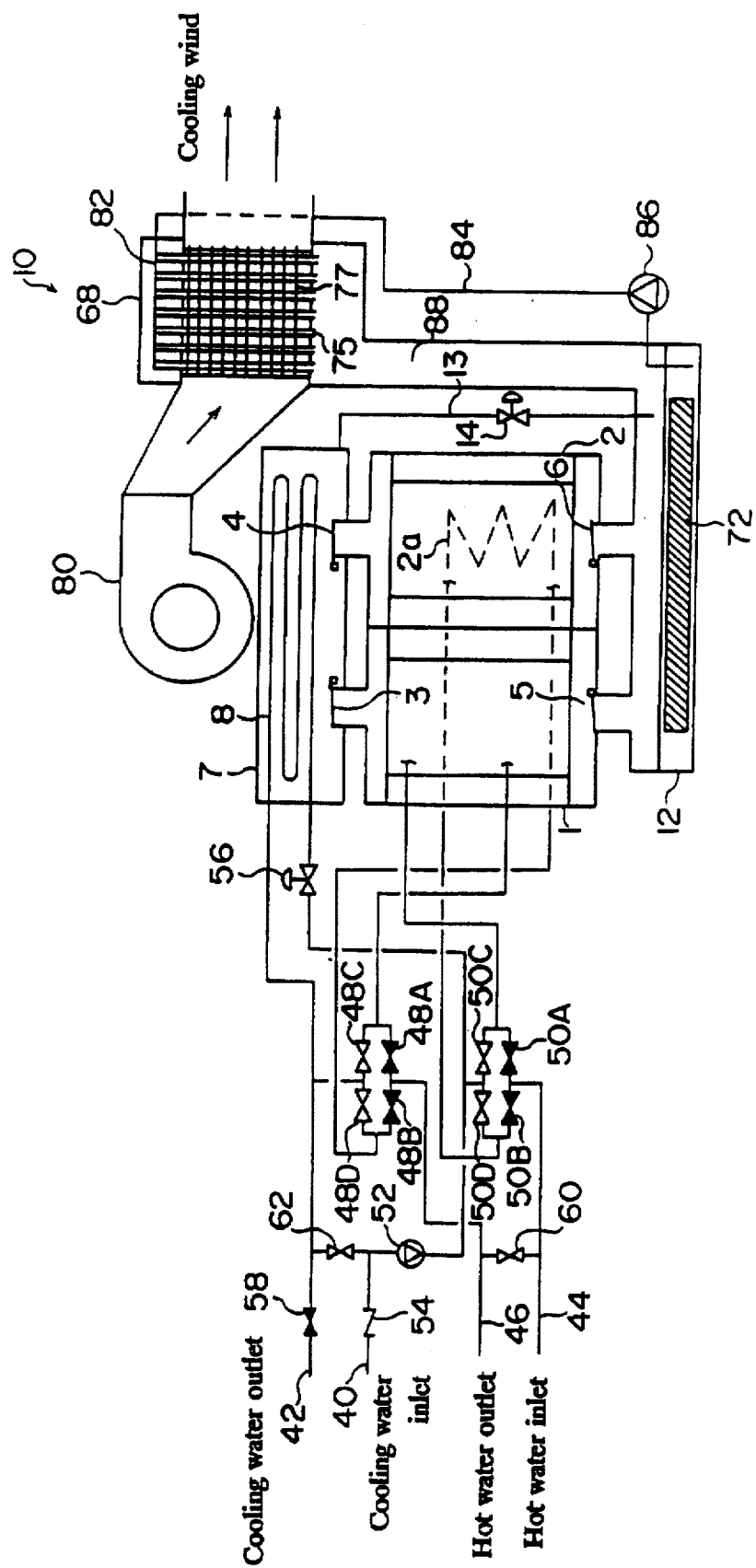
Figure 17:
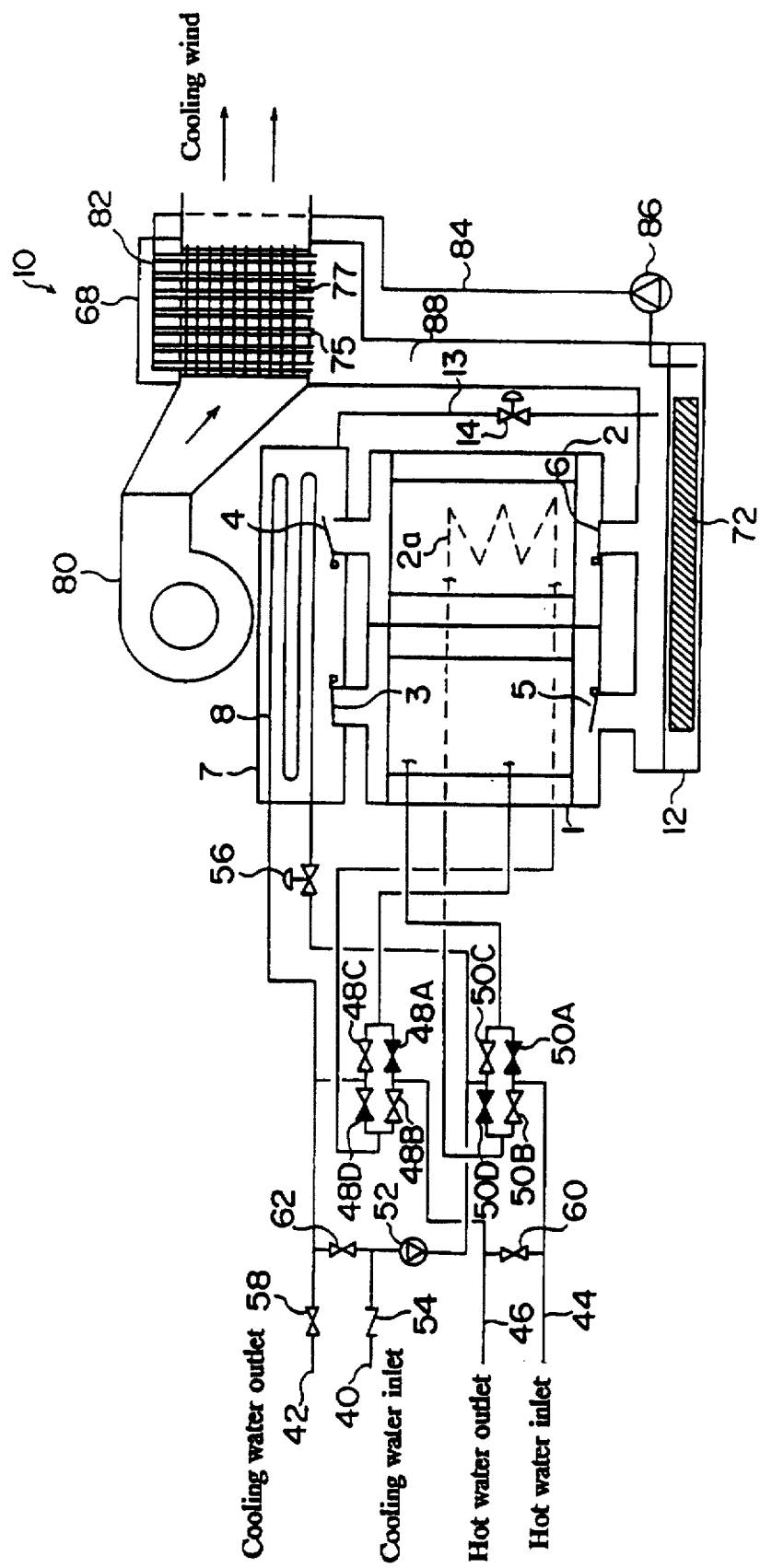

FIGS. 15 to 17 show a different embodiment of the adsorption type air cooler with a coolant tank and a load cooler provided as separate units according to the invention as claimed in claims 6 to 8. Like the preceding embodiment, this cooler comprises two adsorbent heat exchangers 1 and 2, condenser 14, coolant tank 12, air cooler 68 and coolant pump 36 for forcing liquid coolant from the coolant tank 12 to the air cooler 68.

The adsorbent heat exchangers 1 and 2 each include an adsorbent layer filled with an adsorbent, for instance silica gel, and a coil type heat exchange tube 2a buried in the adsorbent layer. Vapor coolant is adapted to pass through the adsorbent layer.

The condenser 7 is a horizontal vapor coolant/cooling water heat exchanger disposed above the two adsorbent heat exchangers 1 and 2. It includes an upper condensing section having a heat exchange tube 8 which is formed by serially connecting U-shaped tubes and a liquid pool provided below the upper condensing section.

In the condenser 7, vapor coolant which is provided as a result of desorbing from the adsorbent heat exchangers 1 and 2 and enters the condenser 7 from a lower inlet, is cooled and condensed by cooling water flowing through the heat exchange tube 8, and liquid coolant as condensate is collected in the lower liquid pool.

The above structure and arrangements are all the same as in the previous embodiment.

The coolant tank 12 is a horizontal vessel disposed underneath the two adsorbent heat exchangers 1 and 2. It includes an upper space section and a lower liquid pool. Unlike the previous embodiment, a cold accumulating member 72 is provided in the liquid pool. In this embodiment, as the cold accumulating member is used "T-47" sold by Transfuse Systems Inc. "T-47" is a product composed of a amorphous inorganic salt, which has a melting temperature of 8.3° c. and latent heat of melting of 22.8 kcal/kg and is sealed in a capsule. Its volume change at the phase transition point is very slight.

The coolant tank 12 has two upper outlets connected to the respective adsorbent heat exchangers 1 and 2. The upper outlets are provided with respective on-off valves 5 and 6 which are opened and closed according to a program of a controller (not shown).

The liquid pools of the coolant tank 12 and condenser 7 are connected to each other by a liquid coolant duct line 13 provided with a throttle valve 14. The liquid coolant in the liquid pool in the condenser 7 flows into the coolant tank 12 with its flow rate controlled by the throttle valve 14. The throttle valve 14 controls the liquid level of the coolant tank 12 through control of the flow rate of liquid coolant, and also it can cause flushing of liquid coolant.

The air cooler 68 is an air/liquid coolant heat exchanger having a number of heat exchange tubes 75 with fins. Air enters the air cooler 68 through a fan 80, and as it passes by the heat exchange tubes 75 it is cooled via fins 77 by liquid coolant flowing through the heat exchange tubes 75 before being supplied to a given place.

The heat exchange tubes 75 of the air cooler 68 extend vertically and are communicated at the top with a header 82, which is connected via a liquid coolant supply duct line 84 to the coolant tank 12. A coolant pump 86 is provided on an intermediate portion of the duct line 84.

The lower end of each of the heat exchange tubes 75 is open to lower space section of the air cooler 68, and the lower space section is communicated via a large diameter descending duct line tube 88 with a space section of the coolant tank 12.

Liquid coolant is forced out from the coolant tank 12 by the coolant pump 86 to be led through the coolant supply duct line 84 and header 82 to the heat exchange tubes 75 to be partly gassified while cooling air. Then, it flows out of the heat exchange tubes 75 to be led through the descending tube 88 to the coolant tank 12 for separation of gas and liquid. The adsorbent heat exchanger 1 or 2 in the adsorbing process is in a reduced pressure state for absorbing vapor coolant, and with this pressure difference the vapor coolant is led from the air cooler 68 into the adsorbent heat exchanger 1 or 2.

As shown in FIG. 15, cooling water supply and exhaust tubes 40 and 42 connected to the adsorbent heat exchangers 1 and 2, hot water supply and exhaust tubes 44 and 46 connected thereto, and further a connecting tube connecting cooling water and hot water supply tubes 40 and 44 and a connecting tube connecting cooling water and hot water exhaust tubes 42 and 46 are provided together with switching valves 48A to 48D and 50A to 50D and check valves to supply cooling water and hot water to the adsorbent heat exchangers 1 and 2 and condenser 7. Further, a pump 52 for pumping out cooling water is provided on the cooling water supply tube 40.

The operation of this embodiment of the cooler 10 will now be described.

FIG. 15 shows the on-off state of various valves when the adsorbent heat exchangers 1 and 2 are in the desorbing and adsorbing processes, respectively. FIG. 16 shows the valve state in the heat recovery process. FIG. 17 shows the valve state when the adsorbent heat exchangers 1 and 2 are in the adsorbing and desorbing processes, respectively. In FIGS. 15 to 17, the valves shown white are in the open state, and those shown black are in the closed state.

In the state shown in FIG. 15, hot water is led through the hot water supply tube 44 and valve 50A to the adsorbent heat exchanger 1 to heat the adsorbent therein and desorb vapor coolant having been adsorbed to the adsorbent. Hot water emerging from the heat exchanger 1 is led through the valve 48A and hot water exhaust tube 46 to the outside.

The desorbed vapor coolant rises to be led through the on-off valve 3A in the open state to the condenser 7 to be cooled and condensed by cooling water flowing through the heat exchange tube 8 and collected in the lower liquid pool in the condenser 7.

Cooling water supplied to the condenser 7 is led through the cooling water supply tube 40, check valve 54, re-circulating pump 52, flow rate control valve 56 and heat exchange tube 8 in the condenser 7, and after emerging from the condenser 7 it is led through the valve 58 and cooling water exhaust tube 42 to the outside.

The liquified coolant flows through the liquid coolant tube 13 while its flow rate is controlled by the throttle valve 14, and enters the coolant tank 12. The throttle valve 14 controls the flow rate of the liquid coolant entering it from the condenser 7 such as to maintain the liquid coolant level in the coolant tank 12.

Liquid coolant is forced out from the coolant tank 12 by the coolant pump 86 and passes through the heat exchange tube 75 in the air cooler 68. Air is forcedly supplied by the fan 80 for heat exchange with coolant via the fins 77 on the heat exchange tube 75 to be cooled down and then led out from the outlet of the air cooler 80 into a desired chamber. Meanwhile, liquid coolant is partly evaporated by obtaining latent heat of evaporation from air, and the resultant vapor coolant is mostly returned as liquid to the coolant tank 12.

Vapor coolant passes through the on-off valve 6 in the open state to be withdrawn into the adsorbent heat exchanger 2 in the adsorbing process and adsorbed to the adsorbent. Thus, the pressure in the air cooler 68 and coolant tank 12 is held constant.

In order to remove the heat of adsorption generated in the adsorbent heat exchanger 2 so as to maintain the absorbing activity of the adsorbent, it is necessary to cool the adsorbent layer in the heat exchanger 2. Accordingly, the coolant water has been forced through the cooling water supply tube 40 and check valve 54 by the cooling water pump 52, is partly led through the valve 50D to the heat exchanger 2 to cool the adsorbent therein. The coolant having cooled the adsorbent is led through the valves 48D and 58 and cooling water exhaust tube 42 to the outside.

When the adsorbent in the adsorbent heat exchanger 2 has adsorbed a predetermined amount of vapor coolant, it is saturated and can no longer adsorb vapor. Accordingly, when the heat exchanger 2 has been operated for a desired period of time (for instance about 5 to 10 minutes although the time varies depending on the operating conditions), it is switched to the other heat exchanger 1 in which the adsorbent is regenerated, thus permitting continual adsorption of coolant.

At the moment when it is desired to switch the heat exchangers 1 and 2, the heat exchanger 1 has been heated by the supplied hot water, while the other heat exchanger 2 has been cooled by the supplied cooling water. If the switching is done in this state, it results in the cooling of the heated heat exchanger 1 with cooling water and also in the heating of the cooled heat exchanger 2 with hot water. This results in waste of heat energy, thus lowering the COP.

In this embodiment, a heat recovery operation is brought about for every switching operation to prevent waste of heat energy.

The heat recovery operation will now be described with reference to FIG. 16 showing the on-off state of valves in the heat recovery operation.

As shown, the bypass valve 60 at the hot water outlet and inlet is opened to bypass hot water. In addition, the valves 50C and 50D are opened, the valves 50A and 50B are closed, the valves 48C and 48D are opened, and the valves 48A and 48B are closed. Further, the valve 58 at the cooling water outlet is closed, and the valve 62 is opened.

By bringing about this state of valves, the adsorbent heat exchangers 1 and 2 are disconnected from the external cooling water and hot water supply/exhaust systems.

Further, the on-off valves 3 to 6 are all closed to disconnect the heat exchangers 1 and 2 from the coolant system.

After bringing about the above on-off state of valves, hot water and cooling water are circulated by the cooling water pump 52, and hot water and cooling water retained in the heat exchange tubes 2a in the adsorbent heat exchangers 1 and 2 and also in the duct lines communicated therewith are mixed together to provide the average temperature.

When the adsorbent, hot water and cooling water in the two adsorbent heat exchangers 1 and 2 are brought to the average temperature, in the desorbing process carried out by the heat exchanger 2 the necessary amount of heating is reduced to one half the amount in case when no heat is recovered. Thus, it is possible to considerably improve the COP.

During the short period of the heat recovery operation, for instance about one minute, liquid coolant is liable to become insufficient, resulting an increase of the temperature of cold blast air from the air cooler 68. To avoid this, in this embodiment the cold that is accumulated in the accumulating material 72 in the coolant tank 12 during the normal operation is released during the heat recovery operation.

With the function of the cold accumulating material 72 during the heat recovery operation, it is possible to suppress temperature rise of the coolant re-circulated by the coolant pump 86, thus suppressing the temperature rise of the cold blast air.

When the heat recovery operation shown in FIG. 16 is over, the on-off state of valves shown in FIG. 15 is reversed as shown in FIG. 17, thus bringing the adsorbent heat exchanger 1 to the adsorbing process and the other adsorbent heat exchanger 2 to the desorbing process.

In this embodiment, various valves including the on-off valves 3 to 6 are opened and closed by actuators which are controlled electrically every time the adsorbent heat exchangers are switched.

While the cooler operation is continued, the above operations are switched in the batch cycle, and thus it is possible to supply cold air from the air cooler 68 continuously.

Figure 18:
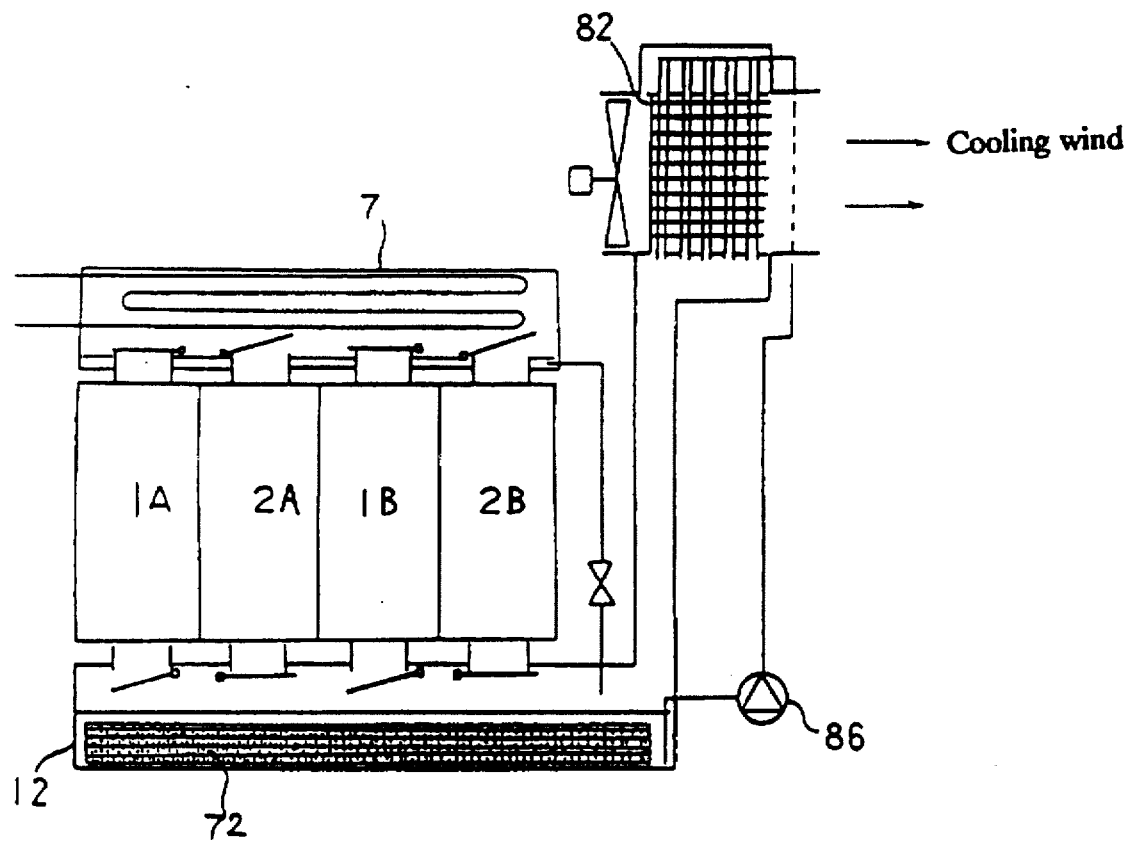
FIG. 18 is a circuit diagram showing the overall circuit of a modification of the embodiment shown in FIG. 15 using a plurality of pairs of adsorbing tanks.

FIG. 18 shows a modification of the above embodiment. In this case, four adsorbent heat exchangers 1A, 1B, 2A and 2B are disposed in parallel. The heat exchangers 1A and 1B are set as a pair, and the other heat exchangers 2A and 2B as another pair. The timing of switching of the adsorbing and desorbing processes is shifted for one pair relative to the other. With this arrangement, when the adsorbing function in one adsorbent heat exchanger pair is stopped for heat recovery operation, continual adsorbing function can be provided by the other adsorbent heat exchanger pair. It is thus possible to continuously supply cold air at stabler blast air temperature.

Figure 13:
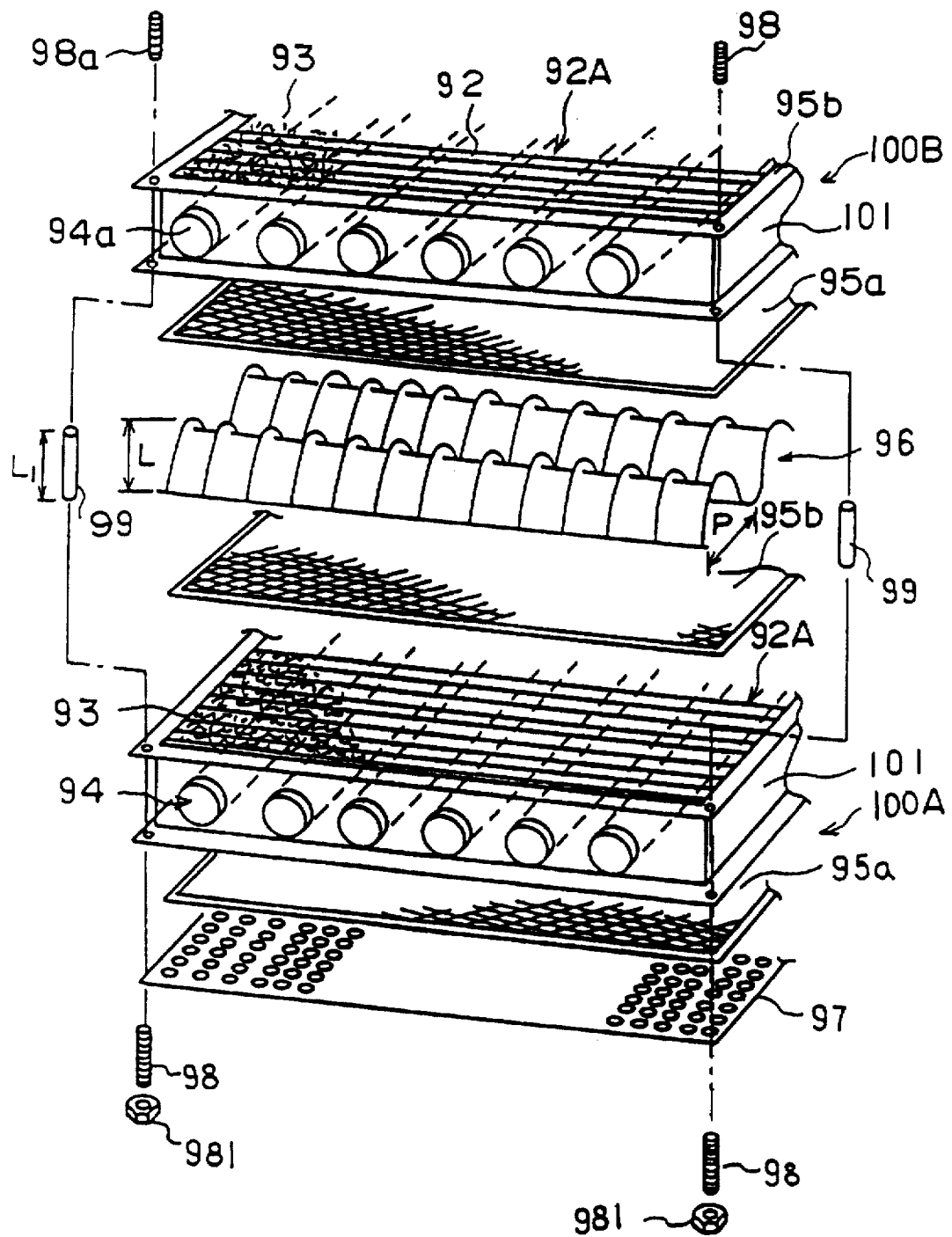
FIG. 13 is an exploded perspective view showing an adsorbent heat exchanger in an embodiment of the invention as claimed in claims 9 to 11.
Figure 14:
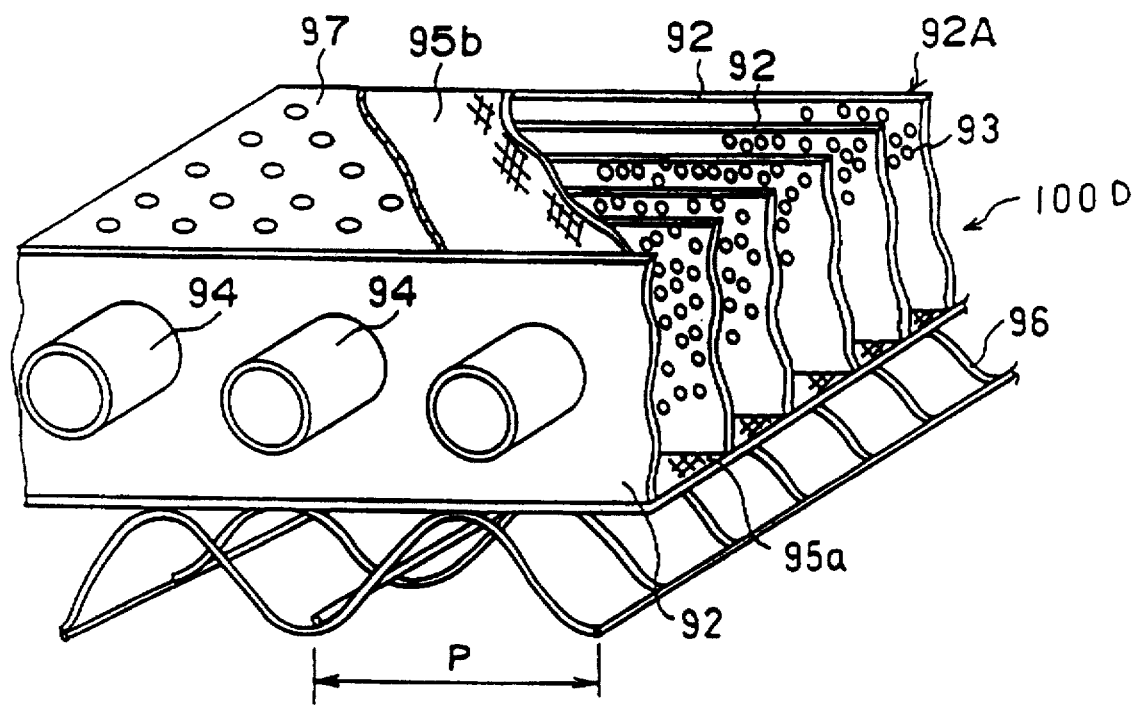
FIG. 14 is a fragmentary, enlarged-scale perspective view showing fin array shown in FIG. 13.

FIGS. 13 and 14 show an adsorbent heat exchanger which is assembled in the above embodiment, which will now be described in the order of steps of manufacture.

While this heat exchanger adopts a method of horizontally stacking a plurality of unit heat exchangers 100 in manufacture, in use the unit heat exchangers 100 may be disposed either horizontally or vertically. Further, it is possible to select cooling tube size, size and shape of plate-like fins and further the kind of adsorbent as desired, and the embodiment to be described is only an example.

In the first place, a plurality of substantially flat, rectangular fin type unit adsorbent heat exchangers are prepared, in each of which a number of plate-like fins 92 are fitted at a predetermined interval on and made integral with a plurality of heat exchange tubes 94 in a row.

Then, a rectangular punching metal member 97 is placed on a horizontal base (not shown), and a metal net 95a of a mesh size capable free from detachment of adsorbent 93 from it, for instance about 40 meshes, is overlapped over the punching metal member 97. The mesh size of metal nets 95a and 95b is determined by the grain size of the adsorbent 93 provided. The punching metal member 97 is provided for the purpose of preventing downward sagging of the 40-mesh metal net 95a when providing the adsorbent 93.

Subsequently, a fin type unit adsorbent heat exchanger body is disposed on the metal net 95a, and then an outer frame 101 of the heat exchanger body, metal net 95a and punching metal member 97 are made integral with one another by means of spot welding.

Thereafter, a fin section 92a is filed with the adsorbent 93 to a sufficient extent such that the adsorbent will not get out of the top of the fins 92. The filling with the adsorbent is suitably made by vibrating the system with a vibrator or the like. By so doing, every corner of the fin section can be filled with the adsorbent.

After the filling with the adsorbent has been completed, the top of the fin section of the unit 100 is sealed with another 40-mesh metal net 95b, which is then secured by means of spot welding to the outer frame 101 of the unit, thus completing a first stage unit heat exchanger 100A.

While the uppermost unit heat exchanger 100 is produced like the first stage one 100A as described above, at the time of the stacking to be described later, the punching metal member 97 is disposed on top of the metal net 95b.

The unit heat exchangers 100B which are stacked between the uppermost and lowermost ones, are each formed not only with the provision of the punching metal member 97 but also by spot welding a pair of metal nets 95a and 95b such that the fin type heat exchanger body filled with adsorbent 93 is sandwiched between the metal nets 95a and 95b.

After preparation of the individual unit heat exchangers 100 as described above, four frame securement bolts 98 are passed through the corners of the outer frame 101 of the first stage unit heat exchanger 100A, and then tube washers 99 are fitted on the respective bolts 98.

The tube washers 99 serve to adjust the interval of the unit heat exchangers 100, i.e., to provide a constant gap L between adjacent unit heat exchangers 100. The gap L is set to a minimum dimension, for instance about 10 mm, such that the adsorbed or desorbed vapor path is not closed.

Then, before stacking the second unit heat exchanger 100B. A wavy sheet-like elastic member 96 is stacked on the upper surface of the metal net 95b of the first stage unit heat exchanger 100A. The elastic member 96 has a free height L1 greater than the gap dimension L noted above so that it provides a spring force when it is pushed or squeezed to the dimension L.

The elastic member 96 is suitably produced by using spring wires having high heat conductivity such that it is a coarse mesh, wavy sheet-like grating, which has small heat capacity, and the top of which engages the fin section 92A over the entire area thereof both longitudinally and transversely.

The second unit heat exchanger 100 is subsequently stacked by fitting it on the frame securement bolts 98 from above the elastic member 96. At this time, the elastic member 96 sinks sufficiently because the gap dimension L between adjacent unit heat exchangers 100 as prescribed by the tube washers 99 is smaller by about 10 mm than its free height L1 (which is prescribed by the size and material of the elastic member and is about 15 to 20 mm). The elastic force that is produced at this time has an effect of pushing the metal nets 95a and 95b against the corresponding fin sections 92A of the unit heat exchangers 100.

In this instance, if the pitch interval P of the wave of the wavy sheet-like elastic members 96 is excessive, the metal nets 95a and 95b may be loose between adjacent spring wires when the stack is completed, thus resulting in movement of the adsorbent 93 though the fin sections 92A or detachment of the adsorbent 93 to places other than the fin sections 92A. In practice, an adequate pitch is about 30 mm. Further, if the elastic members 96 are made of excessively thick wires or their mesh is clogged, it results in an increase of the resistance offered to the passage through the vapor path, and further an increase of the apparent specific heat of the elastic members 96. This means that there is an upper limit imposed on the diameter of the spring wires of the elastic members 96 for reducing the free height thereof.

Subsequently, the third and further unit heat exchangers 100 via elastic members 96 in the manner as described above. As noted above, at the top of the uppermost heat exchanger 100, a punching metal member 97 is secured to metal net 95b, while an elastic member 96 is provided under the bottom side metal net 95a.

After all the unit heat exchangers 100 have been stacked, they are secured together by tightly making units 981 on the frame securement bolts 98.

In case of a stack which has a large number of stages and is thus heavy, the mechanical strength of the stack may be insufficient by merely securing together the outer frames 101 of the unit heat exchangers 100 with the bolts 98. In such a case, further reinforcement may be made by using light weight steel.

Although not shown, the connection of the heat transfer tubes 94 to the header and the switching of cooling water and heat medium for operation of the system are done as in the prior art.

EFFECTS OF THE INVENTION

As has been described in the foregoing, according to the invention it is possible to obtain high COP and stable operation for long time.

Particularly, according to the invention as claimed in claims 1 to 5, with a simple structure and without use of any expensive controller, it is possible to maintain constant the load cold water, i.e., cold output (load) in each batch cycle of the adsorbing and desorbing processes irrespective of variations of input load led to an evaporator.

Amongst the features, in the cycle time it is possible to stabilize the outlet load water temperature to be substantially constant under any load condition in the same state as in the rated operation, and it is also possible to cope with sudden load changes.

Further, according to the invention it is possible to provide a heat recovery cycle between adsorbing and desorbing batch cycles by effectively utilizing the bypass duct line and bypass control valve as noted above, and this leads to further improvement of the COP.

Thus, stringent and high accuracy load water cold output control can be obtained without externally providing any buffer water tank or water temperature control valve for supply water temperature control separately from the load water utility system. Thus, the adsoprtion type cooler according to the invention is applicable like compressor systems or absorption type coolers to any purpose, which could not have been realized by prior art adsorption type coolers, which is very beneficial.

Further, according to the invention as claimed in claims 9 to 11, it is possible to obtain a fin type adsorbent heat exchanger, which can be manufactured readily and at low cost and can readily provide scale merit. In addition, there is no poslllsibility of great reduction of the activity of adsorbent due otherwise possible detachment of the adsorbent from the fin section or movement of the adsorbent. Further, the regenerating and cooling efficiencies of the adsorbent can be greatly increased compared to those in the prior art technique, thus permitting improvement of the COP.

Thus, according to the invention it is possible to establish a method of manufacturing a high performance adsorbent heat exchanger Using inexpensive conventional plate type unit heat exchangers.

Moreover, by using the adsorbent heat exchanger which is manufactured in this way and reduced in weight, it is possible to improve the performance of adsorption type coolers.

What is claimed is:

1. An adsorbent type cooler comprising:

a plurality of adsorbent type heat exchangers with a solid adsorbent accommodated therein;

a coolant tank for selectively introducing coolant vapor to the heat exchangers through heat exchange with load water;

a condenser for condensing coolant vapor selectively released from the heat exchangers;

a cooling water supply line for alternately supplying cooling water to the heat exchangers;

a heat source water supply line for alternately supplying heat source water for regeneration to the heat exchangers;

whereby a cold load output is provided by utilizing the latent heat of evaporation of the coolant in the coolant tank so as to cause the coolant to be recurrently adsorbed to and desorbed from the adsorbent while alternately supplying heat source water for regeneration and cooling water to the heat exchangers;

detecting means for detecting the cold load output after heat exchange with the coolant;

a supply duct line for supplying hot water to the side of a cooling water supply line leading to the heat exchanger in the adsorbing process;

a control valve selectively opened and closed in response to a detection signal from the detecting means, the control valve being provided on the supply duct line, the cooling water supply line, or the heat source water supply line;

an inlet valve for selectively and alternately communicating the heat source water supply line and the cooling water supply line to the plurality of heat exchangers;

an outlet valve for selectively and alternately communicating a cooling water return line and a heat source water return line to the plurality of heat exchangers;

a bypass line for bypassing the cooling water return line or heat source water return line located downstream of the outlet valve and a cooling water return line located upstream of the inlet valve to each other; and a bypass control valve provided on the bypass line, said bypass control valve being selectively opened or closed in response to the detection signal from the detecting means.

2. An adsorbent type cooler according to claim 1, wherein the hot water from the supply duct line comprises at least one kind of hot water selected from the group consisting of heat source water for regeneration, heated cooling water which has passed through a heat exchanger in a heat adsorbing process, cooled heat source water which has passed through a heat exchanger in a heat desorbing process, and heated cooling water which has absorbed the heat of condensation of a coolant.

3. An adsorbent type cooler comprising:

a plurality of adsorbent type heat exchangers with a solid adsorbent accommodated therein;

a coolant tank for selectively introducing coolant vapor to the heat exchangers through heat exchange with load water;

a condenser for condensing coolant vapor selectively released from the heat exchangers;

a cooling water supply line for alternately supplying cooling water to the heat exchangers;

a heat source water supply line for alternately supplying heat source water for regeneration to the heat exchangers;

whereby a cold load output is provided by utilizing the latent heat of evaporation of the coolant in the coolant tank so as to cause the coolant to be recurrently adsorbed to and desorbed from the adsorbent while alternately supplying heat source water for regeneration and cooling water to the heat exchangers;

detecting means for detecting the cold load output after heat exchange with the coolant;

a supply duct line for supplying hot water to the side of a cooling water supply line leading to the heat exchanger in the adsorbing process;

a control valve selectively opened and closed in response to a detection signal from the detecting means, the control valve being provided on the supply duct line, the cooling water supply line, or the heat source water supply line;

a heat source water bypass line for bypassing the heat source water supply line and the heat source water return line to each other; and a bypass control valve for selectively opening and closing the heat source water bypass line.

4. An adsorbent type cooler according to claim 3, wherein the hot water supplied through the supply duct line comprises at least one kind of hot water selected from the group consisting of heat source water for regeneration, heated cooling water which has passed through a heat exchanger in an adsorbing process, cooled heat source water which has passed through a heat exchanger in a desorbing process, and heated cooling water which has absorbed the heat of condensation of a coolant.

5. An adsorbent type cooler comprising:

a plurality of adsorbent type heat exchangers with a solid adsorbent accommodated therein;

a coolant tank for selectively introducing coolant vapor to the heat exchangers through heat exchange with load water;

a condenser for condensing coolant vapor selectively released from the heat exchangers;

a cooling water supply line for alternatively supplying cooling water to the heat exchangers, and a heat source water supply line for alternately supplying heat source water for regeneration to the heat exchangers;

whereby a cold load output is provided by utilizing the latent heat of evaporation of the coolant in the coolant tank so as to cause the coolant to be recurrently adsorbed to and desorbed from the adsorbent while alternately supplying heat source water for regeneration and cooling water to the heat exchangers;

a load cooler for cooling the load while causing partial evaporation of coolant liquid supplied from the coolant tank via a pump through heat exchange of the coolant liquid with the load, the mixture of the coolant liquid and coolant vapor after the heat exchange being returned from the load cooler to the coolant tank for vapor-liquid separation; and a cold accumulating material accommodated in the coolant tank.

6. An adsorbent type cooler according to claim 5, further comprising:

a change-over valve for communicating one heat transfer tube of a first adsorbent type heat exchanger and a heat transfer tube of a second adsorbent type heat exchanger with each other; and mixing means for mixing, after the end of an adsorbing process of said first adsorbent type heat exchanger, cooled fluid and heated fluid in heat transfer tubes of the heat exchangers and duct lines communicated with the heat transfer tubes.

\* \* \* \* \*